United States Patent
Rochon et al.

(10) Patent No.: US 11,853,949 B1
(45) Date of Patent: Dec. 26, 2023

(54) SYSTEM AND METHOD OF USER INTERFACE FOR AUTOMOTIVE PRODUCTION PLANNING

(71) Applicant: JDA Software Group, Inc., Scottsdale, AZ (US)

(72) Inventors: Benoît Rochon, Montréal (CA); Vincent Raymond, Montréal (CA); Eric Prescott-Gagnon, Montréal (CA); Thierry Moisan, Montréal (CA)

(73) Assignee: Blue Yonder Group, Inc., Scottsdale, AZ (US)

( * ) Notice: Subject to any disclaimer, the term of this patent is extended or adjusted under 35 U.S.C. 154(b) by 459 days.

(21) Appl. No.: 15/891,069

(22) Filed: Feb. 7, 2018

Related U.S. Application Data

(60) Provisional application No. 62/458,271, filed on Feb. 13, 2017.

(51) Int. Cl.
*G06Q 10/0637* (2023.01)
*G06Q 10/0631* (2023.01)
*G06Q 30/0201* (2023.01)
*G06Q 50/28* (2012.01)

(52) U.S. Cl.
CPC ... *G06Q 10/0637* (2013.01); *G06Q 10/06313* (2013.01); *G06Q 10/06315* (2013.01); *G06Q 30/0201* (2013.01); *G06Q 50/28* (2013.01)

(58) Field of Classification Search
CPC ....... G06Q 10/06313; G06Q 10/06315; G06Q 10/0637; G06Q 30/0201; G06Q 50/28
USPC ...................................... 705/7.23, 7.25, 7.36
See application file for complete search history.

(56) References Cited

U.S. PATENT DOCUMENTS

| | | | |
|---|---|---|---|
| 2003/0216975 A1* | 11/2003 | Montey | G06Q 10/087 705/28 |
| 2015/0073929 A1* | 3/2015 | Psota | G06Q 30/0241 705/26.2 |
| 2016/0026949 A1* | 1/2016 | Inoue | G06Q 10/0631 705/7.36 |

OTHER PUBLICATIONS

Heinecke, Resilient Automotive Production in Vulnerable Supply Networks: A Supply Chain Event Management System, Doctoral Thesis, ETH Zurich (2013) (Year: 2013).*

\* cited by examiner

*Primary Examiner* — Charles Guiliano
(74) *Attorney, Agent, or Firm* — Spencer Fane LLP; Steven J. Laureanti

(57) ABSTRACT

A system and method are disclosed including a computer and a processor and memory. The computer receives option constraint limiting values of a second option parameter based on a value for a first option parameter, wherein the first option parameter and the second option parameter comprise mix rates for options for a configuration. The computer further generates an interactive element for setting values of the first option parameter and an interactive element for setting the value for the second option parameter and displays the one or more interactive elements. The computer still further, in response to a value being set for the first option parameter, calculates limits for the values of the second option parameters and prevents the interactive element for setting the value for the second option parameter to be set to values outside of the calculated limits.

20 Claims, 12 Drawing Sheets

SYSTEM AND METHOD OF USER INTERFACE FOR AUTOMOTIVE PRODUCTION PLANNING

CROSS-REFERENCE TO RELATED APPLICATIONS

The present disclosure is related to that disclosed in the U.S. Provisional Application No. 62/458,271, filed Feb. 13, 2017, entitled "System and Method of User Interface for Automotive Production Planning." U.S. Provisional Application No. 62/458,271 is assigned to the assignee of the present application. The subject matter disclosed in U.S. Provisional Application No. 62/458,271 is hereby incorporated by reference into the present disclosure as if fully set forth herein. The present invention hereby claims priority under 35 U.S.C. § 119(e) to U.S. Provisional Application No. 62/458,271.

TECHNICAL FIELD

The present disclosure relates generally to automotive production planning and specifically to a system and method of a user interface for determining automobile option mix rates in a multi-plant multi-market multi-period supply chain.

BACKGROUND

Automobiles (such as cars, trucks, and other types of motorized vehicles) are typically sold in various configurations. Each configuration can have hundreds or thousands of different options. For example, a car may be sold in different trims, such as a sport model, economy model, premium model, or the like. Each of the models may have a different type of engine, radio, upholstery, lighting, or other components. Some of the components may always be sold together in the same configuration while others may never be sold in the same configuration. The configurations of the many components of the typical automobile makes determining an automotive production plan difficult. The complexity to determine automobile production with so many configurations is undesirable.

BRIEF DESCRIPTION OF THE DRAWINGS

A more complete understanding of the present invention may be derived by referring to the detailed description when considered in connection with the following illustrative figures. In the figures, like reference numbers refer to like elements or acts throughout the figures.

DETAILED DESCRIPTION

Figure 1:
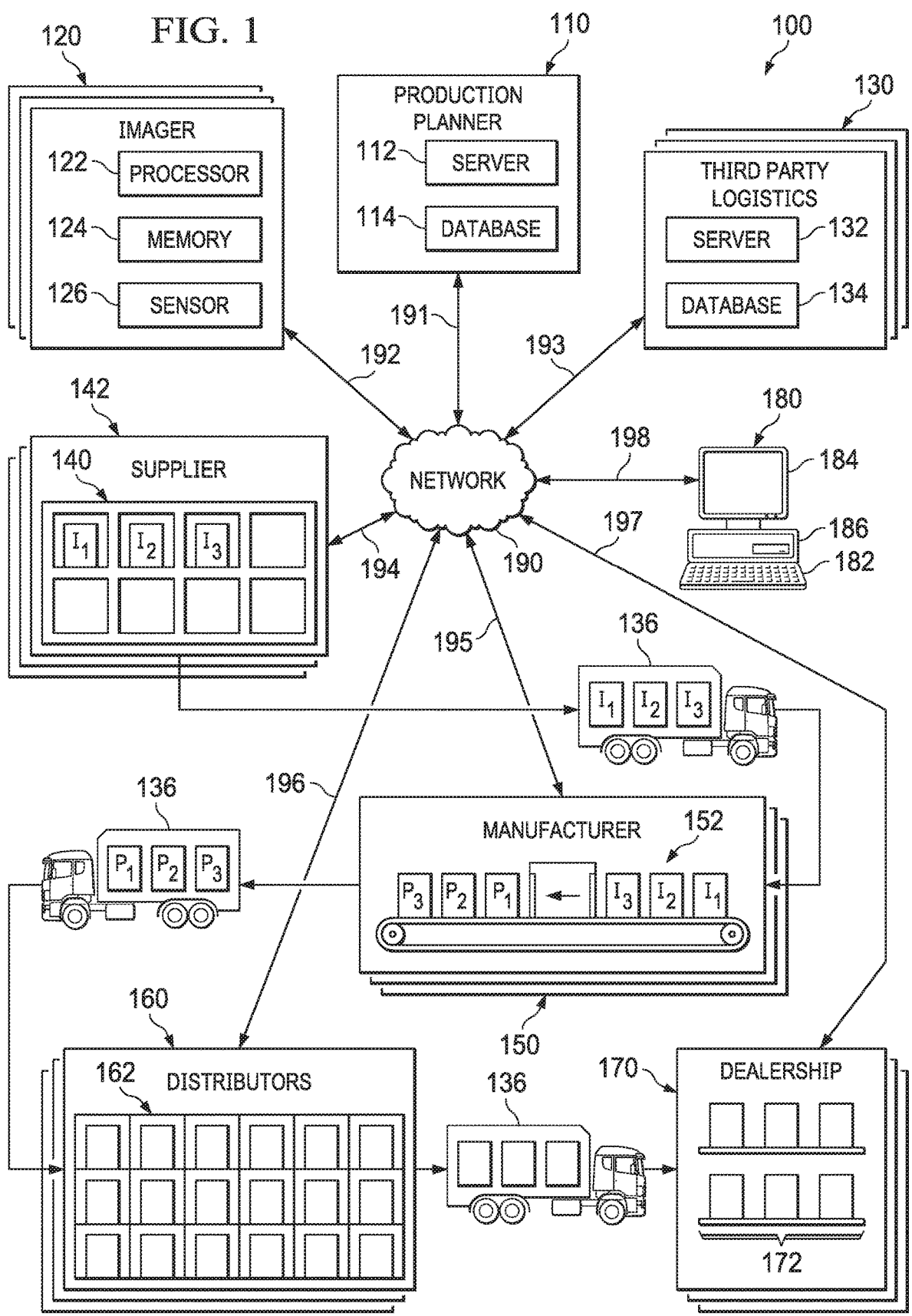
FIG. 1 illustrates an exemplary supply chain network according to a first embodiment.

Aspects and applications of the invention presented herein are described below in the drawings and detailed description of the invention. Unless specifically noted, it is intended that the words and phrases in the specification and the claims be given their plain, ordinary, and accustomed meaning to those of ordinary skill in the applicable arts.

In the following description, and for the purposes of explanation, numerous specific details are set forth in order to provide a thorough understanding of the various aspects of the invention. It will be understood, however, by those skilled in the relevant arts, that the present invention may be practiced without these specific details. In other instances, known structures and devices are shown or discussed more generally in order to avoid obscuring the invention. In many cases, a description of the operation is sufficient to enable one to implement the various forms of the invention, particularly when the operation is to be implemented in software. It should be noted that there are many different and alternative configurations, devices and technologies to which the disclosed inventions may be applied. The full scope of the inventions is not limited to the examples that are described below.

As described more fully below, aspects of the following disclosure relate to production planning of automobile configurations in a multi-plant multi-market multi-period automobile supply chain network. Automobiles (such as cars, trucks, and other types of motorized vehicles) are typically sold with the presence or absence of various components substituted for one another. The presence, absence, or substitution of any components may be termed as an "option." A typical automobile may comprise hundreds or thousands of options, which may be sold as various combinations of options, or configurations. For example, a particular automobile model may be sold in various types of trim, such as a sports trim, economy trim, mid-range trim, premium trim, or the like. Examples of automobile models are sports utility vehicle (SUV), station wagon, sedan, coupe, hatchback, electric, and the like. Each of the automobile models may be associated with available options such as a specific type of engine (e.g. V8, V6, four cylinder), radio (e.g. AM/FM radio, satellite radio, touchscreen interface, navigation equipment), upholstery (e.g. fabric, leather, race-style seating), lighting (e.g. fog lamps, HID lights, LED lights, projector headlights), or other like options. Some of the options may be interdependent such that some options must always be included together, some options may never be included together, and some options may or may not be included in the same configuration. In addition, selecting automobile configurations may be dependent on more than just the interdependency of options. Selecting such a configuration may be dependent on demand, capacity and other manufacturing and logistical constraints, lead time, supply chain disruption, lot sizes, and other factors. Such factors play a crucial role in configuration decisions such as adding or removing options from a configuration or whether to introduce a new configuration.

During automobile production planning, the mix rates (or ratio) of each option that will be included in the set of completed automobiles produced is determined and set. The production planner may initially set the mix rates based on only business information, which may not take into account the feasibility of production. Later, the mix rates may be repaired so the mix rates match production and viability constraints.

Embodiments of the current disclosure aid the production planner in determining mix rates used for production and give responsive feedback to parameter changes inside a group of mix rates. Some embodiments comprise a graphic user interface (GUI) comprising interactive elements that set mix rates while providing feedback for satisfying real-world constraints. According to other embodiments, the GUI comprises graphics that directly illustrate and visualize issues with setting parameters, why some parameters cannot change beyond a certain level, tradeoffs between various parameter settings, and the like. When conflicts in constraints arise, a notification is generated by the interface which allows production planners to receive immediate feedback indicating the reason mix rates may not be set at a particular level, without relying on calls to an optimization engine. Additionally, the GUI defines a workflow based, in part, on the one or more constraints. Some constraints cannot be fixed directly in the interface due to their complexity, so for some constraints, the GUI interfaces with an optimization engine that uses a mathematical model to model automobile configurations.

FIG. 1 illustrates exemplary supply chain network 100 according to a first embodiment. Supply chain network 100 comprises production planner 110, one or more imagers 120, third party logistics 130, automobile suppliers 140, automobile manufacturers 150, automobile distributors 160, automobile dealerships 170, computer 180, network 190, and communication links 191-198. Although a single production planner 110, one or more imagers 120, one or more third party logistics 130, one or more automobile suppliers 140, one or more automobile manufacturers 150, one or more automobile distributors 160, one or more automobile dealerships 170, a single computer 180, and a single network 190 are shown and described, embodiments contemplate any number of production planners, imagers, third party logistics, automobile suppliers, automobile manufacturers, automobile distributors, automobile dealerships, computers, and networks, according to particular needs.

In one embodiment, production planner 110 comprises server 112 and database 114. According to embodiments, production planner 110 calculates and sets one or more mix rates or ratios of each option that will be included in the set of completed automobiles. As described in more detail below, embodiments of production planner 110 comprise a GUI comprising interactive elements for setting mix rates used for production and giving responsive feedback to changes of option parameters inside a group of mix rates. According to other embodiments, the GUI comprises graphics that illustrate and visualize issues with setting parameters, why some parameters cannot change beyond a certain level, tradeoffs between various parameter settings, and the like.

According to embodiments, one or more imagers 120 comprise one or more processors 122, memory 124, one or more sensors 126, and may include any suitable input device, output device, fixed or removable computer-readable storage media, or the like. Additionally, one or more imagers 120 may receive imaging information from one or more sensors 126 or from one or more databases in supply chain network 100. According to embodiments, one or more imagers 120 identify items near the one or more sensors 126 and generate a mapping of the item in supply chain network 100. As explained in more detail below, one or more third party logistics 130, suppliers 140, manufacturers 150, distributors 160, and dealerships 170 use the mapping of an item to locate the item in the supply chain network 100. The location of the item is then used to coordinate the storage and transportation of items in supply chain network 100 to implement one or more plans generated by production planner 110. Plans may comprise one or more of a production plan, demand plan, option plan, sales and operation plan, and master plan, as described herein.

One or more imagers 120 may comprise a mobile handheld device such as, for example, a smartphone, a tablet computer, a wireless device, or the like. In addition, or as an alternative, one or more imagers 120 comprise one or more networked configured to transmit item identity information to one or more databases as an item passes by or is scanned by sensor 126 of one or more imagers 120. This may include, for example, a stationary scanner located at one or more third party logistics 130, suppliers 140, manufacturers 150, distributors 160, or dealerships 170 that identifies items as the items pass near the scanner, including in one or more transportation vehicles 136, or a mobile scanner that identifies items as the mobile scanner passes by one or more items, such as, for example, a mobile robotic scanner which scans items on store shelves or products in a warehouse. One or more sensors 126 of one or more imagers 120 may comprise an imaging sensor, such as, a camera, scanner, electronic eye, photodiode, charged coupled device (CCD), or other like sensor identifies images of automobiles or automotive components or reads labels, barcodes, or the like coupled with automobiles or automotive components. In addition, or as an alternative, one or more sensors 126 may comprise a radio receiver and/or transmitter configured to read an electronic tag coupled with an automobile or automotive component, such as, for example, an RFID tag. Each of the one or more automobiles or automotive components may be represented in supply chain network 100 by an identifier, including, for example, serial number, barcode, tag, RFID, or any other object that encodes identifying information. One or more imagers 120 may generate a mapping of one or more automobiles or automotive components in supply chain network 100 by scanning an identifier or object associated with an item using sensor 126 and identifying the item based, at least in part, on the scan.

Third party logistics 130 comprises server 132 and database 134. According to embodiments, third party logistics 130 directs one or more transportation vehicles 136 to ship one or more items between one or more third party logistics 130, suppliers 140, manufacturers 150, distributors 160, or dealerships 170, based, at least in part, on the quantities of a production plan determined by production planner 110.

Transportation vehicles 136 comprise, for example, any number of trucks, cars, vans, boats, airplanes, unmanned aerial vehicles (UAVs), cranes, robotic machinery, or the like. Transportation vehicles 136 may comprise radio, satellite, or other communication that communicates location information (such as, for example, geographic coordinates, distance from a location, global positioning satellite (GPS) information, or the like) with production planner 110, one or more imagers 120, third party logistics 130, suppliers 140, manufacturers 150, distributors 160, and/or dealerships 170 to identify the location of the transportation vehicle 136 and the location of any inventory or shipment located on the transportation vehicle 136. In addition to the production plan, the number of items shipped by transportation vehicles 136 in third party logistics 130 may also be based, at least in part, on the number of items currently in stock at one or more third party logistics 130, suppliers 140, manufacturers 150, distributors 160, or dealerships 170, the number of items currently in transit, forecasted demand, a supply chain disruption, and the like. According to embodiments, transportation vehicles 136 may be associated with one or more suppliers 140, manufacturers 150, distributors 160, or dealerships 170, or another supply chain entity, according to particular needs.

As shown in FIG. 1, supply chain network 100 operates on one or more computers 180 that are integral to or separate from the hardware and/or software that support production planner 110 and one or more imagers 120, third party logistics 130, suppliers 140, manufacturers 150, distributors 160, and dealerships 170. Supply chain network 100 comprising production planner 110 and one or more imagers 120, third party logistics 130, suppliers 140, manufacturers 150, distributors 160, and dealerships 170 may operate on one or more computers 180 that are integral to or separate from the hardware and/or software that support the production planner 110 and one or more imagers 120, third party logistics 130, suppliers 140, manufacturers 150, distributors 160, and dealerships 170. Computers 180 may include any suitable input device 182, such as a keypad, mouse, touch screen, microphone, or other device to input information. Output device 184 may convey information associated with the operation of supply chain network 100, including digital or analog data, visual information, or audio information.

Computer 180 may include fixed or removable computer-readable storage media, including a non-transitory computer readable medium, magnetic computer disks, flash drives, CD-ROM, in-memory device or other suitable media to receive output from and provide input to supply chain network 100. Computer 180 may include one or more processors 186 and associated memory to execute instructions and manipulate information according to the operation of supply chain network 100 and any of the methods described herein. In addition, or as an alternative, embodiments contemplate executing the instructions on computer 180 that cause computer 180 to perform functions of the method. Further examples may also include articles of manufacture including tangible computer-readable media that have computer-readable instructions encoded thereon, and the instructions may comprise instructions to perform functions of the methods described herein.

Production planner 110 and one or more imagers 120, third party logistics 130, suppliers 140, manufacturers 150, distributors 160, and dealerships 170 may each operate on one or more separate computers, a network of one or more separate or collective computers, or may operate on one or more shared computers. In addition, supply chain network 100 may comprise a cloud based computing system having processing and storage devices at one or more locations, local to, or remote from production planner 110 and one or more imagers 120, third party logistics 130, suppliers 140, manufacturers 150, distributors 160, and dealerships 170. In addition, each of the one or more computers 180 may be a work station, personal computer (PC), network computer, notebook computer, tablet, personal digital assistant (PDA), cell phone, telephone, smartphone, mobile device, wireless data port, augmented or virtual reality headset, or any other suitable computing device. In an embodiment, one or more users may be associated with production planner 110 and one or more imagers 120, third party logistics 130, suppliers 140, manufacturers 150, distributors 160, and dealerships 170. These one or more users may include, for example, a "manager" or a "planner" handling production planning and/or one or more related tasks within supply chain network 100. In addition, or as an alternative, these one or more users within supply chain network 100 may include, for example, one or more computers programmed to autonomously handle, among other things, production planning, demand planning, option planning, sales and operations planning, order placement, automated warehouse operations (including removing automobile components from and placing automobile components in inventory), robotic production machinery (including building or assembling automobiles or automobile components), and/or one or more related tasks within supply chain network 100.

One or more third party logistics 130, suppliers 140, manufacturers 150, distributors 160, and dealerships 170 represent one or more automotive supply chain entities in one or more supply chain networks 100, including one or more enterprises. One or more third party logistics 130 may be any suitable entity that provides warehousing and transportation for automobile or automotive components in the automobile supply chain. Third party logistics 130 may, for example, receive an automobile or automotive component from a supply chain entity in the supply chain network and store and transport the automobile or automotive component for another supply chain entity. One or more third party logistics 130 may comprise automated warehousing systems that automatically remove automobile components from and place automobile components into inventory based, at least in part, on a production plan, demand plan, option plan, sales and operation plan, or master plan determined by production planner 110. Automotive components may comprise, for example, components, materials, products, parts, items, or supplies that may be used to produce automobiles or other automotive components. In addition, or as an alternative, an automotive component may comprise a part of the automobile or a supply or resource that is used to manufacture the automobile, but does not become a part of the automobile.

One or more suppliers 140 may be any suitable entity that offers to sell or otherwise provides one or more automotive components to one or more automotive manufacturers 150. Suppliers 140 may comprise automated distribution systems 142 that automatically transport automobiles and automotive components to one or more automotive manufacturers 150 based, at least in part, on a production plan, demand plan, option plan, sales and operation plan, or master plan determined by production planner 110 and/or one or more other factors described herein.

Automobile manufacturer 150 may be any suitable entity that manufactures at least one automobile or automotive component. Manufacturer 150 may use one or more automotive components during the manufacturing process to manufacture, fabricate, assemble, or otherwise process an automobile or automotive component. An automobile or automotive component may be supplied to another automobile manufacturer 150, third party logistics 130, supplier 140, distributor 160, and/or dealership 170 in the automobile supply chain network 110. Automobile manufacturer 150 may, for example, produce and sell an automobile or automotive component to supplier 140, another manufacturer 150, a distributor 160, dealership, 170 a customer, or any other suitable person or entity. Such automobile manufacturers 150 may comprise automated robotic production machinery 152 that produces automobiles and automobile components based, at least in part, on a production plan, demand plan, option plan, sales and operation plan, or master plan determined by production planner 110.

Distributor 160 may be any suitable entity that offers to sell or otherwise distributes at least one automobile or automotive component to one or more dealerships 170 and/or customers. Distributors 160 may, for example, receive a product from a first automotive supply chain entity in supply chain network 100 and store and transport the product for a second automotive supply chain entity. Such distributors 160 may comprise automated warehousing systems 162 that automatically transport to one or more dealerships 170 or customers and/or automatically remove from or place into inventory automobiles and automobile components based, based, at least in part, on a production plan, demand plan, option plan, sales and operation plan, or master plan determined by production planner 110. One or more dealerships 170 may be any suitable entity that obtains one or more automobiles or automotive component to sell to one or more customers. In addition, one or more dealerships 170 may sell, store, and supply one or more automotive components and/or repair an automobile with one or more automotive components. One or more dealerships 170 may comprise any online or brick and mortar location, including locations with shelving systems 172. Shelving systems 172 may comprise, for example, various racks, fixtures, brackets, notches, grooves, slots, or other attachment devices for fixing shelves in various configurations. These configurations may comprise shelving with adjustable lengths, heights, and other arrangements, which may be adjusted by an employee of one or more dealerships 170 based on computer-generated instructions or automatically by machinery to place automobiles or automotive components in a desired location.

Although one or more third party logistics 130, suppliers 140, manufacturers 150, distributors 160, and dealerships 170 are shown and described as separate and distinct entities, the same entity may simultaneously act as any one or more third party logistics 130, suppliers 140, manufacturers 150, distributors 160, and dealerships 170. For example, one or more automobile manufacturers 150 acting as a manufacturer could produce an automobile or automotive component, and the same entity could act as a supplier to supply an automobile or automotive component to another automotive supply chain entity. Although one example of a supply chain network 100 is shown and described; embodiments contemplate any configuration of supply chain network 100, without departing from the scope of the present disclosure.

In one embodiment, production planner 110 may be coupled with network 190 using communications link 191, which may be any wireline, wireless, or other link suitable to support data communications between production planner 110 and network 190 during operation of supply chain network 100. One or more imagers 120 are coupled with network 190 using communications link 192, which may be any wireline, wireless, or other link suitable to support data communications between one or more imagers 120 and network 190 during operation of distributed supply chain network 100. Third party logistics 130 may be coupled with network 190 using communications link 193, which may be any wireline, wireless, or other link suitable to support data communications between third party logistics 130 and network 190 during operation of supply chain network 100.

One or more suppliers 140 may be coupled with network 190 using communications link 194, which may be any wireline, wireless, or other link suitable to support data communications between one or more suppliers 140 and network 190 during operation of supply chain network 100. One or more manufacturers 150 may be coupled with network 190 using communications link 195, which may be any wireline, wireless, or other link suitable to support data communications between one or more manufacturers 150 and network 190 during operation of supply chain network 100. One or more distributors 160 may be coupled with network 190 using communications link 196 which may be any wireline, wireless, or other link suitable to support data communications between one or more distributors 160 and network 190 during operation of supply chain network 100. One or more dealerships 170 may be coupled with network 190 using communications link 197, which may be any wireline, wireless, or other link suitable to support data communications between one or more dealerships 170 and network 190 during operation of supply chain network 100. Computer 180 may be coupled with network 190 using communications link 198, which may be any wireline, wireless, or other link suitable to support data communications between computer 180 and network 190 during operation of supply chain network 100.

Although communication links 191-198 are shown as generally coupling production planner 110 and one or more imagers 120, third party logistics 130, suppliers 140, manufacturers 150, distributors 160, dealerships 170, and computer 180 to network 190, each of production planner 110 and one or more imagers 120, third party logistics 130, suppliers 140, manufacturers 150, distributors 160, dealerships 170, and computer 180 may communicate directly with each other, according to particular needs.

In another embodiment, network 190 includes the Internet and any appropriate local area networks (LANs), metropolitan area networks (MANs), or wide area networks (WANs) coupling production planner 110 and one or more imagers 120, third party logistics 130, suppliers 140, manufacturers 150, distributors 160, dealerships 170, and computer 180. For example, data may be maintained by locally or externally of production planner 110 and one or more imagers 120, third party logistics 130, suppliers 140, manufacturers 150, distributors 160, dealerships 170, and computer 180 and made available to one or more associated users of production planner 110 and one or more imagers 120, third party logistics 130, suppliers 140, manufacturers 150, distributors 160, dealerships 170, and computer 180 using network 190 or in any other appropriate manner. For example, data may be maintained in a cloud database at one or more locations external to production planner 110 and one or more imagers 120, third party logistics 130, suppliers 140, manufacturers 150, distributors 160, dealerships 170, and computer 180 and made available to one or more associated users of production planner 110 and one or more imagers 120, third party logistics 130, suppliers 140, manufacturers 150, distributors 160, dealerships 170, and computer 180 using the cloud or in any other appropriate manner. Those skilled in the art will recognize that the complete structure and operation of network 190 and other components within supply chain network 100 are not depicted or described. Embodiments may be employed in conjunction with known communications networks and other components.

In accordance with the principles of embodiments described herein, production planner 110 and/or one or more automotive supply chain entities may generate one or more supply chain plans, including a production plan, a demand plan, an option plan, a sales and operation plan, and a master plan, and modify the supply chain based on the generated plans. For example, according to some embodiments, production planner 110 automatically places orders for automobile or automotive components at one or more suppliers 140, manufacturers 150, or distributors 160, initiates manufacturing of the automobile or automotive components at one or more manufacturers 150, and determines automobile or automotive components to be carried at one or more dealerships 170. Furthermore, production planner 110 may instruct automated machinery (i.e., robotic warehouse systems, robotic inventory systems, automated guided vehicles, mobile racking units, automated robotic production machinery, robotic devices and the like) to adjust product mix ratios, inventory levels at various stocking points, production of products of manufacturing equipment, and proportional or alternative sourcing of one or more third party logistics 130, suppliers 140, manufacturers 150, distributors 160, and dealerships 170 based on one or more generated plans and/or current inventory or production levels. For example, the methods described herein may include computers 180 receiving product data from automated machinery having at least one sensor and the product data corresponding to an item detected by the automated machinery. The received product data may include an image of the item, an identification code, serial number, and/or other product data associated with the automobile or automotive component (dimensions, texture, estimated weight, and any other like attributes). The method may further include computers 180 looking up the received product data in database 114 associated with production planner 110 to identify the item corresponding to the product data received from the automated machinery.

Computers 180 may also receive, from the automated machinery, a current location of the identified automobile or automotive component. Based on the identification of the automobile or automotive component, computers 180 may also identify (or alternatively generate) a first mapping in the database system, where the first mapping is associated with the current location of the identified automobile or automotive component. Computers 180 may also identify a second mapping in the database system, where the second mapping is associated with a past location of the identified automobile or automotive component. Computers 180 may also compare the first mapping and the second mapping to determine if the current location of the identified automobile or automotive component in the first mapping is different than the past location of the identified automobile or automotive component in the second mapping. Computers 180 may then send instructions to the automated machinery based, as least in part, on one or more differences between the first mapping and the second mapping such as, for example, to locate automobile or automotive component to add to or remove from an inventory of one or more third party logistics 130, suppliers 140, manufacturers 150, distributors 160, and dealerships 170.

Figure 2:
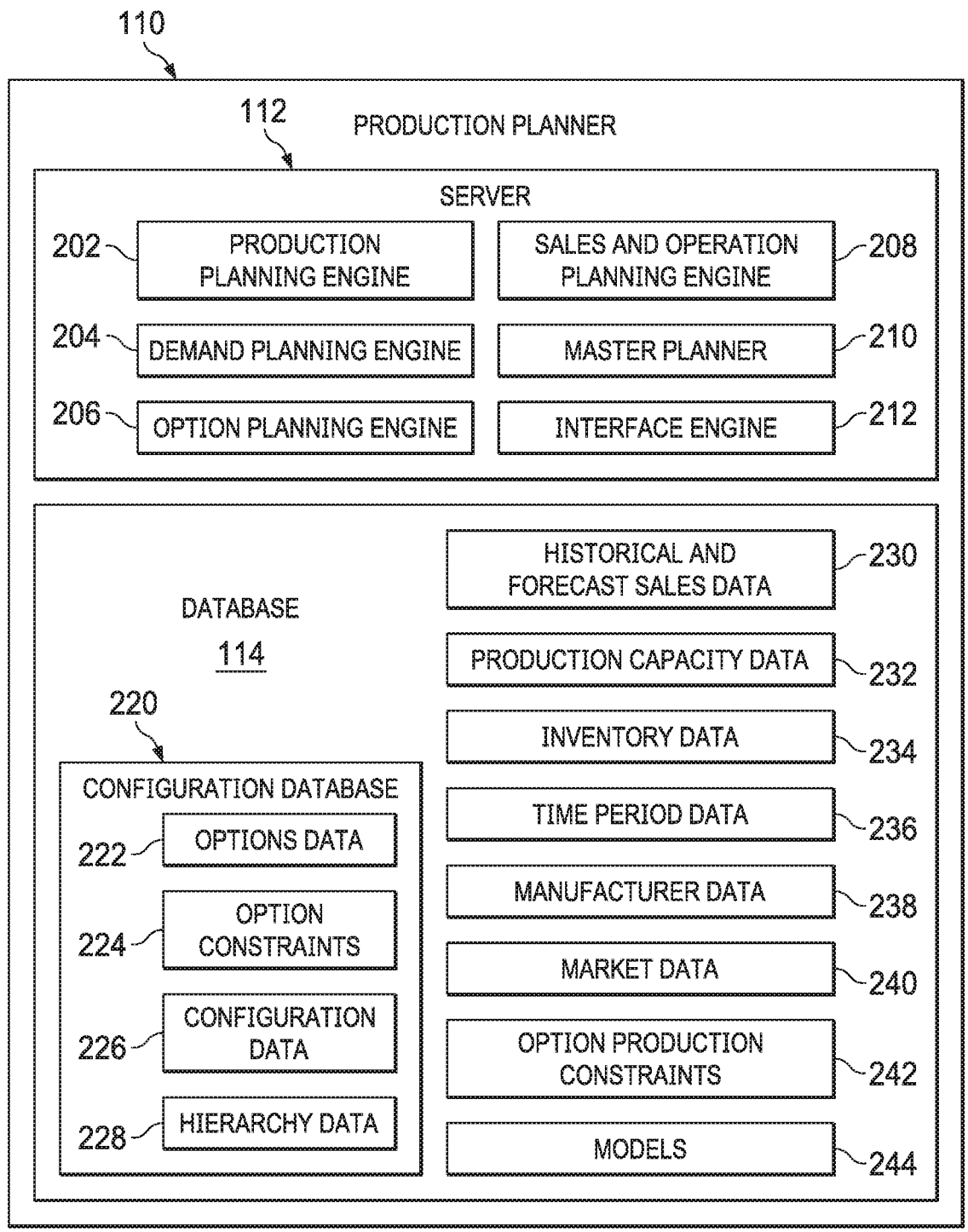
FIG. 2 illustrates the production planner of FIG. 1 in greater detail, in accordance with an embodiment.

FIG. 2 illustrates production planner 110 of FIG. 1 in greater detail, in accordance with an embodiment. As discussed above, production planner 110 may comprise server 112 and database 114. Although production planner 110 is shown and described as comprising a single server 112 and database 114, embodiments contemplate any suitable number of servers or databases internal to or externally coupled with production planner 110. In addition, or as an alternative, production planner 119 may be located internal or external to the one or more third party logistics 130, suppliers 140, manufacturers 150, distributors 160, and dealerships 170 according to particular needs.

According to embodiments, server 112 of production planner 110 may comprise production planning engine 202, demand engine 204, option engine 206, sales and operations engine 208, master planner 210, and interface engine 212. In addition, database 114 of production planner 110 comprises a configuration database 220 (which comprises options data 222, option constraints 224, configuration data 226, and hierarchy data 228), sales forecast data 230, production capacity data 232, inventory data 234, time period data 236, manufacturer data 238, market data 240, option production constraints 242, and models 244. Although particular engines, planners, engines, and databases are shown and described, embodiments contemplate any suitable number or combination of engines, planners, engines, and databases located at one or more locations, local to, or remote from, production planner 110, according to particular needs. Furthermore, the engines, planners, engines, and databases may be located at one or more locations, local to or remote from, production planner 110 such as on multiple servers or computers at any location in the supply chain network, such as networked among one or more third party logistics 130, suppliers 140, manufacturers 150, distributors 160, and dealerships 170.

Production planning engine 202 of server 112 may determine a production plan based, at least in part, on one or more constrained or unconstrained plans received from demand planning engine 204, option planning engine 206, and/or sales and operations planning engine 208. For example, production planner 110 may reconcile the option plan from option engine 206 according to the demand plan received from demand planning engine 204 and the sales and operations plan received from sales and operation engine 208, iteratively, to generate a production plan. In other words, production planner 110 may receive the demand plan, option plan, and sales and operations plan and refine each of the plans iteratively to generate a production plan.

According to embodiments, production planner 110 generates a production plan based, at least in part, on automobile configurations (including predefined vehicle configurations, which may be referred to as "predefined automobiles"), historical and forecast sales data 230, production capacity data 232, inventory data 234, time period data 235, manufacturer data 238, market data 240, option production constraints 242, and any other constraints in accordance with one or more models 244. The predefined automobiles may comprise, for example, a list of automobile configurations which may include a demand associated with particular options, configurations, or fully defined vehicles (FDV). Each automobile configuration may be represented by a serial number, code, or other alphanumeric string representing one or more, or all, of the possible options for an automobile configuration.

Historical and forecast sales data 230 may comprise, for example, past and projected demand ort sales organized according to any particular criteria, including automobile models, automobile options, automobile configurations, components, automobiles, markets, periods, and the like. According to some embodiments, historical and forecast sales data 230 of comprises data generated by demand planning engine 204. In addition, or as an alternative, historical and forecast sales data 230 comprises a forecasted demand, such as, for example, a demand forecasted from demand data received by dealerships 170 about expected consumer demand and may be based, at least in part, on projections from historical sales.

Production capacity data 232 may comprise data establishing the minimum and maximum capacity for production of one or more manufacturers 150 for automobile or automobile components over a given time period and may be associated with a lead time. Inventory data 234 may comprise the minimum and maximum number of automobiles models or automobile components that may be stored at various stocking points in the supply chain as well as the current or projected stock at each stocking point. According to embodiments, production planning engine 202 receives and transmits inventory data 234, including item identifiers, pricing data, attribute data, inventory levels, and other like data about one or more automobiles or automotive components between one or more locations in the supply chain network 100 including among one or more third party logistics 130, suppliers 140, manufacturers 150, distributors 160, and dealerships 170.

Time period data 236 may comprise, for example, any suitable time information, such as a planning period of weeks, months, days, years, quarter, or any other suitable period over which one or more plan is determined. Importantly, time period information may be especially critical to the functionality of production planner 110 where a production planner may need to consider inputs over a long period, such as, for example, between one and two years, or longer. Manufacturer data 238 may comprise data relating to the manufacturing plants for automobile or automobile components such as the markets served by each manufacturer 150, the distribution chains for each manufacturer 150, and the types of automobile and automobile components that may be manufactured at each manufacturer 150. Market data 240 may comprise data delineating the regions (geographic, economic, or otherwise) that are used to model distribution of automobile or automobile components.

Manufacturer data 238 and market data 240 may comprise, for example, the number, type, and location of automobile manufacturers 150 and the markets that those manufacturers 150 serve. For example, manufacturers 150 may be associated with a particular region where the manufacturer 150 operates, such as, the United States, Canada, Mexico, Europe, or any other geographical region, such as a state, country, or continent. Similarly, markets may be divided into any desired geographical region, such as by state, country, continent, or any other region. Markets may comprise, for example, the Americas, Europe, and Asia, or markets may comprise the United States, Mexico, and Canada. Any other combination of manufacturing plant and market information may be organized into any desired region, according to particular needs. Option production constraints 242 are related to the capability of the manufacturers 150 to produce options and may comprise production constraints such as, for example, production capacity for particular options. According to some embodiments, option production constraints 242 are defined by a combination of logical operators. Models 244 of the database may comprise any suitable model of an automobile supply chain. According to some embodiments, the models comprise a network model comprising nodes and arcs where nodes represent manufacturers 150, automobile configurations, and markets and arcs represent the movement of automobile stock.

Demand planning engine 204 of server 112 may receive historical and forecast sales data 230, such as, for example, past and projected demand data and marketplace data from dealerships 170 and determine a demand plan, based, at least in part, on the received data.

Option planning engine 206 of server 112 may determine an option plan by associating constraints with options of automobile option packages according to options and configurations stored in configuration database 220. Options data 222 of configuration database 220 may comprise data identifying available options associated with the make and models of automobiles. Each option may be associated with a particular automobile or one or more options may be associated with one or more automobiles, according to particular needs. Options may comprise selectable or configurable features, components, or configurations of automobiles. For example, options may comprise selection of an engine, transmission, wheels, color, seats, head lamps, quality of materials (such as interior or exterior finish options), brakes, tires, intake, exhaust, spoiler, or other components or systems of an automobile. Options may comprise the absence or presence of any automotive component (such as, for example, having a spoiler or not having a spoiler) or may represent a particular configuration of any automotive component (such as, for example, having a V8 engine versus a 4-cylinder engine). Options may comprise a particular version or part number of a selected automotive component, which may vary based on geographical location, safety requirements, ruggedness, value (such as, for example, a premium versus an economy model), or like considerations.

One or more of the options may have relationships that define various combinations and permutations of options in a finished automobile and/or an automotive component. These relationships may be defined by option constraints 224 of configuration database 220. Option constraints 224 comprise limits and permissions for relationships between options, such as limits to which options may occur together in a configuration and which options may not occur together in a configuration. Option constraints 224 may require that certain options are always found in an automobile together, are never found in an automobile together, are dependent or independent of other options, must be found in specific ratios in the automobile, and other like rules and constraints. For example, option constraints 224 may include, for example, that "premium leather seating is only available with V-8 engine." Therefore, any option for premium leather seating would be allowed only if the option for V-8 engine also occurred in the same configuration. Embodiments contemplate any suitable option constraints 224, according to particular needs. Option planning engine 206 may use options constraints 224 to refine the demand plan of the demand planning engine, such that, the demand for options is compatible with supply chain constraints, such as, for example, option production constraints 244.

In addition, options constraints 224 may be assigned to options according to a hierarchy stored in hierarchy data 228.

Figure 3:
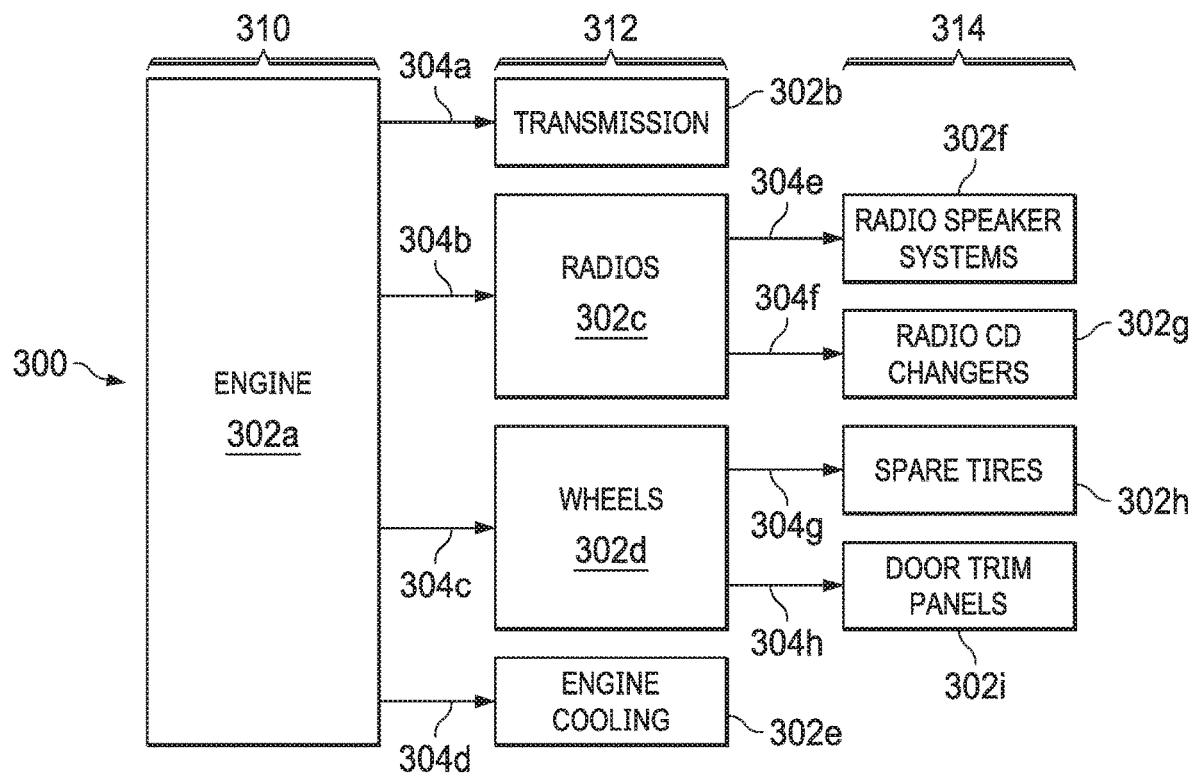
FIG. 3 illustrates a hierarchy of option groups, according to an embodiment.

FIG. 3 illustrates hierarchy 300 of option groups 302a-302i, according to an embodiment. Options may be organized in hierarchy 300 of nodes and connectors, where every node in the hierarchy represents one of option groups 302a-302i and each node is connected by connectors 304a-304h which indicate priority of the options in option groups 302a-302i.

According to embodiments, option groups 302a-302i comprise options organized by the component they modify. For example, option groups 302a-302i may each represent a choice for a particular component for an automobile where a single option must be selected. Such choices may include, for example, selecting an option for a particular engine, as represented by engine option group 302a. Additional choices for selecting options include: selecting a transmission at transmission option group 302b, selecting a radio at radios option group 302c, selecting wheels at wheels option group 302d, selecting engine cooling system at engine cooling option group 302e, selecting radio speaker systems at radio speaker systems option group 302f, selecting radio CD changers at radio CD changers option group 302g, selecting spare tire at spare tire group 302h, and selecting door trim panels at door trim panels option group 302i. Although particular option groups 302a-302i are shown, embodiments contemplate any suitable option groups representing choices for options for an automobile, including, for example, vehicle packages, interior seats, storage/cargo area, transfer cases, miscellaneous functional options, mirrors, sunroofs, sound insulation, seat adjustors, emission systems, audio/video/satellite systems, steering columns, parking assist viewing systems, and the like.

Each option group 302a-302i may be associated with a priority that indicates the order in which the options are chosen. Higher priority options are grouped in option groups 302a-302i with higher priorities, and lower priority options are grouped in option groups 302a-302i with lower priorities. According to embodiments, when selecting options for automobile configurations, higher priority options are selected before the lower priority. According to embodiments, hierarchy 300 comprises three levels of priority: first priority level 310, second priority level 312, and third priority level 314. First priority level 310 (comprising engine option group 302a) may represent a high priority. Second priority level 312 (comprising transmission option group 302b, radios option group 302c, wheels option group 302d, and engine cooling option group 302e) represents an intermediate priority. Third priority level 314 (comprising radio speaker systems option group 302f, radio CD changers option group 302g, spare tire group 302h, and door trim panels option group 302i) represents a low priority. Options in each of options groups 302a-302i inherit the priority of the option group 302a-302i in which it is grouped. For example, options in engine option group 302a comprise the highest priority, inherited from engine option group 302a, and are selected before options with intermediate priority and least priority. Options in transmission option group 302b, radios option group 302c, wheels option group 302d, and engine cooling option group 302e inherit an intermediate priority. These intermediate priority options are selected after the higher priority options from engine option group 302a but before any lower priority options. Lower priority options, such as options in radio speaker systems option group 302f, radio CD changers option group 302g, spare tire group 302h, and door trim panels option group 302i, are selected after the high priority and intermediate priority options.

Additionally, radio speaker systems option group 302f and radio CD changers option group 302g both depend from radios option group 302c as indicated by connectors 304e-304f. Similarly, spare tires option group 302h and door trim panels option group 302i both depend from wheels option group 302d as indicated by connectors 304g-304h. According to embodiments, this indicates that option parameters for options from radios option group 302c must be set before option parameters for options from radio speaker systems 302f and radio CD changers 302g, which are constrained by radios option group 302c Similarly, option parameters for options from wheels option group 302d must be set before option parameters for options from spare tires option group 302h and door trim panels option group 302i which are constrained by wheels option group 302d. Once option parameters are set (such as, for example, setting mix rates for various engine options) the mix rates for transmissions, radios, wheels, and engine cooling options are constrained based upon the engine option mix rates, as explained in more detail below. Although a particular example of hierarchy 300 of option groups 302a-302i is given, embodiments contemplate any suitable hierarchy of option groups according to particular needs.

Each combination or permutation of automobile options may be termed a configuration stored as configuration data 226. A configuration may comprise any collection of one or more selected automobile options, including any component or part of an automobile that may be configured, including permitted and disallowed configurations of each automobile. By way of example only, and not by way of limitation the following indicates some possible options for different groups. Options in the vehicle packages group may comprise, for example, a high-altitude package, an off-road package, an all-wheel drive package, a trailer tow package, a high-performance package, and the like. Interior seat packages may comprise interior seat options such as, for example, cloth bucket seats, leather trim seats, premium leather seats, perforated leather seats, and the like. The storage/cargo area group may comprise storage/cargo area options such as, for example, cargo tie down loops, cargo trim panel with storage net, cargo compartment cover, cargo net, and the like. The door trim panels group may comprise door trim panel options such as, for example, luxury door trim panel, leather wrapped upper door trim, Laguna door trim panel, premium door trim panel, base door trim panel, and the like. Constraints on the selection and combination of options may comprise one or more rules such as, for example, "if option A is selected, then option B must also be selected," "option B cannot be selected when option A is selected," "if option A and option B are selected, then either of option C or option D must be selected." By way of a more particular example, option constraints 224 for an option in an automobile may comprise, for example, if a vehicle has a rear DVD entertainment center, then it cannot also have an AM/FM/BT Radio. This may be based on limitations of that particular radio model not interfacing with the particular DVD entertainment center, for example. Other option constraints 224 may comprise, for example, when a vehicle has body color exterior mirrors, it cannot have the upgraded exterior appearance group, luxury group II, or the chrome edition group; when the vehicle has the advanced technology group and the 3.0 L V6 engine, it must have amplified speakers and a subwoofer; and when the vehicle has a full size spare tire, it cannot have a trailer towing group. The rules may be used to set limits on option mix rates for options in the same group, or options in other groups. For example, if one of the rules requires that when a vehicle has a power sunroof option, it cannot have the luxury group II package option, then once the power sunroof option is set to a rate X (between 0 and 100%), then the luxury group II package option cannot be set higher than 100-X. As described in more detail below, one or more interactive elements of the GUI may be automatically set to a maximum mix rate based on these rules and calculations.

Sales and operations planning engine 208 of server 112 may determine a sales and operations plan based, at least in part, on option production constraints 242. According to embodiments, sales and operations planning engine 208 receives option production constraints 242 such as, for example, constraints covering production limits on select options. For example, production limits may be maximum supply available per a defined time horizon that is available to meet a particular demand volume.

According to embodiments, demand planning engine 204 and option planning engine 206 determine an unconstrained demand plan and option plan. In one embodiment, sales and operations planning engine 208 receives an unconstrained demand and option plan as an input and then constrains the plan based on production limits and option compatibility. In addition, or as an alternative, the output of the sales and operations plan may comprise a constrained demand and option plan which may not equal the unconstrained plan. In addition, the sales and operations plan may be visible and applicable to all parts of supply chain network 100.

After the demand plan, option plan, and sales and operations plan are determined and production planning engine 202 generates a production plan, master planner 210 of server 112 may generate a master plan and communicate the master plan to one or more third party logistics 130, suppliers 140, manufacturers 150, distributors 160, and dealerships 170 to produce automobiles or automotive components according to the refined master plan. As an example only and not by way of limitation, master planner 120 may place orders with one or more third party logistics 130, suppliers 140, manufacturers 150, and distributors 160 to produce or ship automobile and automotive components according to the master plan and may communicate to dealerships 170 the quantity and options of automobiles and automotive components that will be produced and the date that the automobiles and automotive components will arrive at dealerships 170.

According to embodiments, the level of granularity in the master plan is different than the production plan. Master planning may comprise, for example, a buffer of an amount of material and an operation that processes or transforms the material into an item with a set quantity. Embodiments of production planner 110 determine a production plan comprising a higher level of granularity than master planning.

Interface engine 212 of production planner 110 may generate an interface, such as a GUI, comprising one or more interactive elements for setting parameters for option mix rates and receiving notifications for option constraints 224. For example, each option may be organized according to a workflow of one or more option groups 302a-302i. The order of the workflow may be based, at least in part, on the priority assigned to the option group 302a-302i, so that an option group with a higher priority is displayed by the GUI prior to an option group 302a-302i with a lower priority. In addition, or as an alternative, the GUI of interface engine 212 may restrict the selection of parameters such that parameters for options of a higher priority option group must be selected before parameters for options of a lower priority option group. According to embodiments, interface engine 212 executes a GUI displaying each of the options in an option group represented by a label, icon, or other indicator identifying the option, interactive elements for selecting values or ranges of values for option parameters for each option between 0% and 100%, and an input box, allowing for direct input of the option level percentage, as described in more detail below.

Figure 4:
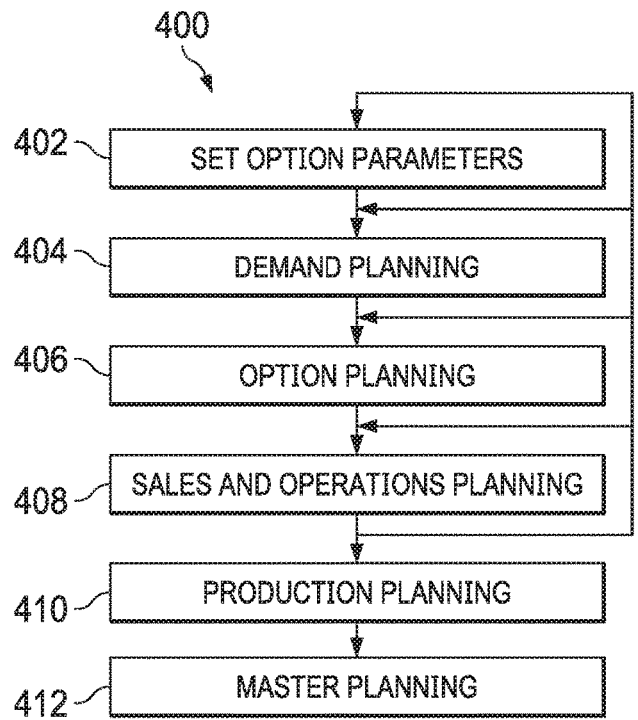
FIG. 4 illustrates an exemplary method of automobile configuration planning according to an embodiment.

FIG. 4 illustrates exemplary method 400 of automobile configuration planning according to an embodiment. Although automobile configuration planning is depicted as a linear process, one or more actions may be performed in any order, combination, or repetitions to perform automobile configuration planning. For example, demand planning 404, option planning 406, and sales and operations planning 408 may comprise iterative processes that are performed multiple times in various orders, such that the demand plan, the option plan, and sales and operations plan inform and refine each other according to sales forecast data 230, production capacity data 232, inventory data 234, time period data 236, manufacturer data 238, market data 240, option production constraints 242, models 244, options data 222, options constraints 224, configuration data 226, and hierarchy data 228. However, during demand planning 404, option planning 406, and sales and operations planning 408, the determined plans generally have few initial constraints, which helps generate plans directed to what the automobile manufacturer 150 would like to build, not necessarily what they are able to build. As the planning proceeds through further actions, more constraints are added or removed to further align a desired plan with a feasible plan.

At action 402, production planner 110 may set parameters for one or more option mix rates of an automobile configuration using an interface generated by interface engine 212, as described below. As discussed above, because configuration planning is an iterative process, option mix rates may be set before or after any one or more of actions of the method 400 of automobile configuration planning.

At action 404, demand planning engine 204 generates a demand plan from a global consolidated view of market demand and production requirements. Demand planning engine 204 may receive historical and forecast sales data 230, option production constraints 244, and the like and generate a demand plan, which may include projected demand for one or more automobiles and automotive components. A demand plan may include a preliminary assessment of data received from dealerships 170, such as, for example, demand for types and quantities of automobiles and automotive components. Production planner 110 may communicate the generated demand plan to the option planning engine 206 and sales and operations planning engine 208.

At action 406, option planning engine 206 may determine the take rates and volumes of automobiles and automotive components at the option level. Option planning engine 206 may refine the demand plan according to the mix or the interaction between available automobile options. After action 304, production planner 110 may return to action 302 and iteratively refine the demand plan according to the option plan, such as analyzing the available options and returning to the demand plan to alter take rate percentages. In addition, or in the alternative, production planner 110 may continue to action 408. At action 408, sales and operations planning engine 208 may generate a sales and operation plan optimized to fulfill market demand and generate forecast orders. For example, sales and operations planning engine 208 may refine the option plan according to production capacity data 232, incrementally, so that, for example, a sales and operation plan is substantially refined according to the demand plan.

At action 410, production planning engine 202 communicates with third party logistics 130, suppliers 140, manufacturers 150, distributors 160, dealerships 170 and/or other automotive supply chain entities to generate a production plan that is optimized based on market demand while respecting constraints. The production plan may determine, for example, which automobiles are to be produced for particular markets, at which manufacturers 150, for each of one or more time periods. The production plan may be based on overall sales forecasts and respects supplier 140 and manufacturer 150 production capacity constraints.

At action 412, master planner 210 generates a master plan for production of automobiles and automobile components. For example, master planner 210 may generate a master plan that determines which automobiles and automotive components will be produced during a specific time frame or planning horizon, and the order or priority of the automobiles and automotive components produced.

Figure 5:
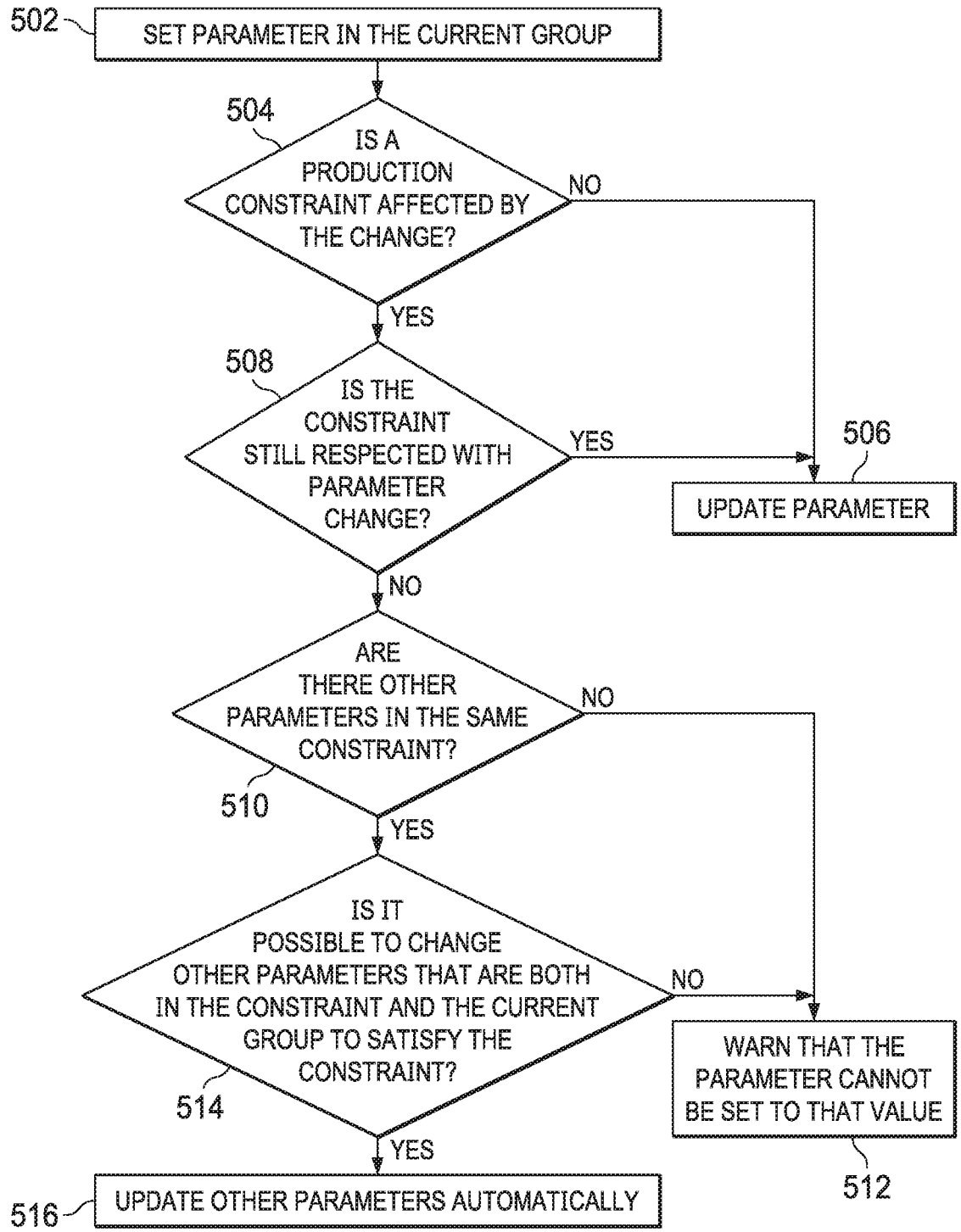
FIG. 5 illustrates an exemplary method of automatically updating option parameters, according to an embodiment.

FIG. 5 illustrates exemplary method 500 of automatically updating option parameters, according to an embodiment. Although the actions of the method are described in a particular order, one or more actions may be performed in one or more combinations or permutations according to particular needs.

According to embodiments, production planner 110 uses method 500 to update option parameters consistent with option constraints 224 in response to an option parameter being set or modified. Option parameters may be set using one or more interactive elements of an interface generated by interface engine 212. When the production planner 110 receives an indication that an option parameter is set, interface engine 212 may automatically update the option parameter, warn that the parameter cannot be set to the selected value, and/or update parameters for one or more other options. According to embodiments, option parameters comprise a value or a range of values for the option mix rates, such as, for example, the percent of automobile models that are planned to be produced with a configuration that comprises that option. The value or range of values for the option parameters may comprise a maximum value, minimum value, a range from a maximum value to a minimum value, an exact value, and/or a range comprising an exact value and a maximum permitted deviance from the exact value.

Method 500 begins at action 502, when an option parameter is selected for an option of an option group 302a-302i. According to embodiments, one or more interactive elements of the interface of interface engine 212 provide for the selection of an option parameter, which may comprise, for example, a new or modified value or range of values for a mix rate. In response to a user selecting an option parameter, interface engine 212 determines if the new or modified value or range of values for the mix rate may be made.

At action 504, interface engine 212 determines if any option constraints 224 is affected by the selected option parameter. If no option constraints 224 are affected by the selected option parameter, method 500 continues to action 506.

At action 506, interface engine 212 updates the option parameter to the selected option parameter.

Returning to action 504, if the interface engine determines one or more option constraints 224 are affected by the selected option parameter, method 500 continues to action 508. At action 508, interface engine 212 determines if the one or more affected option constraints 224 will be respected if the option parameter is set to the selected option parameter. If the one or more affected option constraints 224 are respected by the selected option parameter, method 500 continues to option 506. At action 506, interface engine 212 updates the option parameter to the selected option parameter.

Returning to action 508, if the one or more affected option constraints 224 are not respected by the selected option parameter, method 500 continues to option 510.

At action 510, interface engine 212 determines whether other option parameters are in the same option constraint as the selected option parameter. If interface engine 212 determines that other option parameters are not in the same option constraint as the selected option parameter, method 500 continues to action 512. At action 512, interface engine 212 generates a warning that the option parameter cannot be set to the selected option parameter.

Returning to action 510, if interface engine 212 determines that the other option parameters are in the same option constraint 224 as the selected option parameter, method 600 continues to action 514.

At action 514, interface engine 212 determines whether the option constraint 224 may be satisfied by changing other option parameters that are in the same option constraint 224 and the current option group. If interface engine 212 determines that the option constraint 224 is not satisfied by changing other option parameters that are in the same option constraint 224 and the current option group, method 500 continues to action 512. At action 512, interface engine 212 generates a warning that the option parameter cannot be set to the selected option parameter.

Returning to action 514, if interface engine 212 determines that the option constraint 224 is not satisfied by changing other option parameters that are in the same option constraint 224 and the current option group, method 500 continues to action 516.

At action 516, interface engine 212 automatically updates the other option parameters that are in the same option constraint 224 and the current option group. According to embodiments, limits for each option parameter are updated automatically based on the selection of other values for other option parameters and displayed using graphics to illustrate the range of allowable or prohibited values.

To further illustrate the modification of option parameters according to the interface engine 212, an example is now given.

Figure 6:
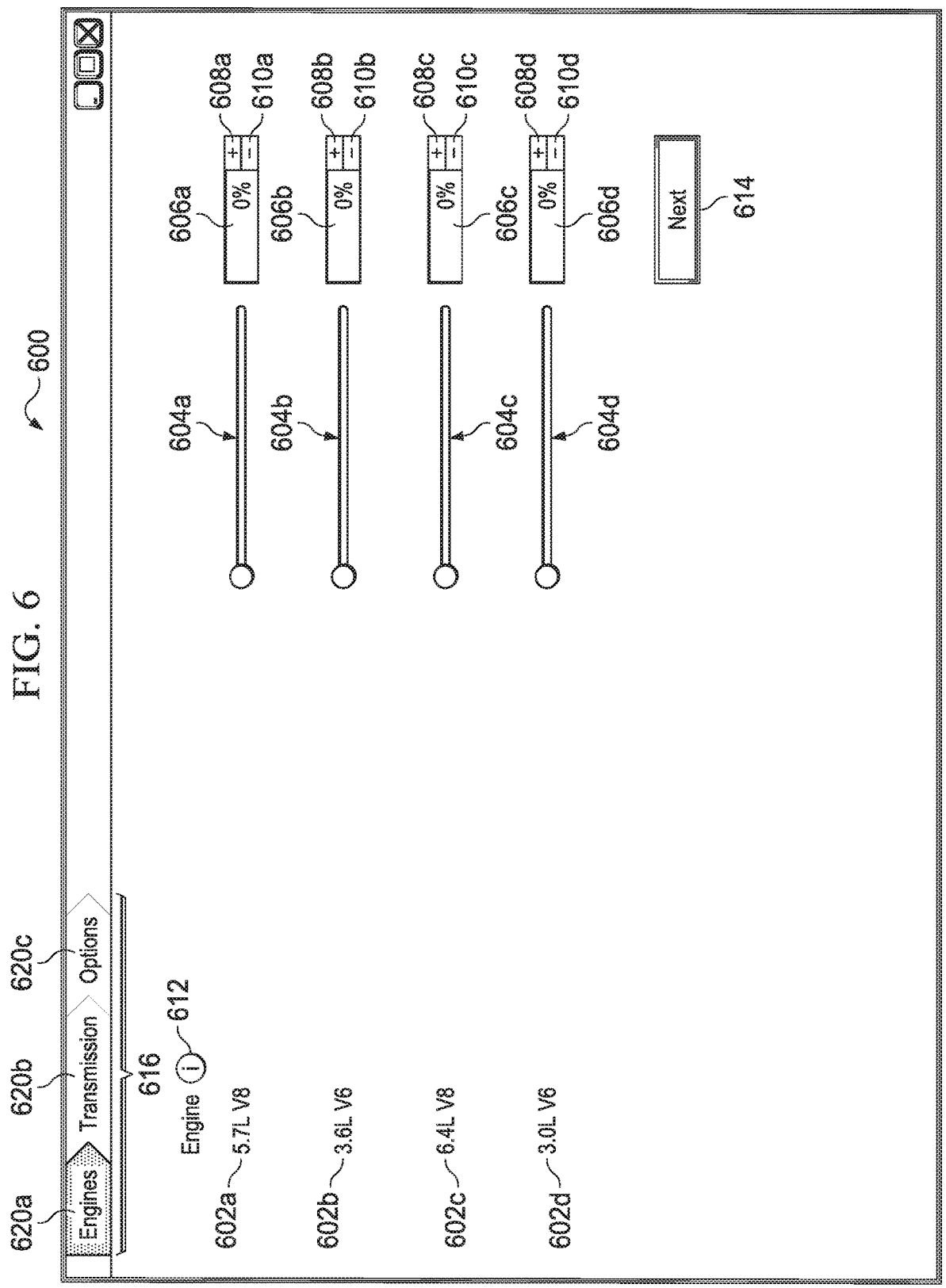
FIG. 6 illustrates an exemplary interface for setting option parameters for options for the engine option group of FIG. 3, according to an embodiment.

FIG. 6 illustrates exemplary interface 600 for setting option parameters for options from engine option group 302a of FIG. 3, according to an embodiment. Exemplary interface 600 comprises one or more interactive elements for setting option parameters and receiving notifications based on option constraints 224 of a first group of options (engine options) 602a-602d from engine option group 302a. Interactive elements of exemplary interface 600 comprise slide bars 604a-604d, text input boxes 606a-606d, max value buttons 608a-608d, min value buttons 610a-610d, notification button 612, next button 614, and workflow navigator 616. Although exemplary interface 600 is described as comprising four engine options 602a-602d, four slide bars 604a-604d, four text input boxes 606a-606d, four max value buttons 608a-608d, four min value buttons 610a-610d, a single notification button 612, a single next button 614, and a single workflow navigator 616, embodiments contemplate any number, combination, or arrangement of options, slide bars, text input boxes, max value buttons, min value buttons, notification buttons, next buttons, and workflow navigators, according to particular needs.

According to embodiments, engine options 602a-602d comprise options from engine option group 302a and are associated with slide bars 604a-604d, text input boxes 606a-606d, max value buttons 608a-608d, and min value buttons 610a-610d which provide for setting a value or range of values for the option parameters of engine options 602a-602d provided that the selections of option parameters do not violate options constraints 224 associated with engine option group 302a.

Notification button 612 comprises a selectable element that, in response to a user selection or other input, causes interface engine 212 to generate and display a notification based on one or more options constraints of engine option group 302a. The notification may comprise, for example, allowable settings for values or ranges of values of option parameters of engine options 602a-602d, reasons why particular selections of values or ranges of values of option parameters are not allowed, and the like. Next button 614 comprises a selectable element that, in response to a user selection or other input, causes interface engine 212 to navigate from the current page of the exemplary interface 600 comprising engine options 602a-602d to a consecutive page of the exemplary interface 600 comprising a group of options from a lower priority option group, such as, for example, transmission option group 302b. Additionally, selecting next button 614 may, according to some embodiments, cause interface engine 212 to store, in a memory or database, the values or ranges of values of option parameters of engine options 602a-602d, prior to displaying the consecutive page comprising options from a lower priority option group.

Workflow navigator 616 comprises a graphical representation of the ordered workflow of interface 600. The order of the workflow may be based, at least in part, on the priority assigned to one or more of option groups 302a-302i, so that options from higher priority option groups are displayed by the GUI prior to options from lower priority option groups. In addition, or as an alternative, the GUI of interface engine 212 may restrict the selection of parameters such that option parameters for options from higher priority option groups must be selected before option parameters for options from lower priority option groups. According to the illustrated example, workflow navigator 616 displays a workflow comprising three pages indicated by the three tabs 620a-620c of workflow navigator 616. According to embodiments, each of the three tabs 620a-620c corresponds to a page of the workflow, and GUI displays the three pages of the workflow in an order where option parameters must be selected for options in the page corresponding to the engine options tab 620a before GUI will display the page corresponding to the transmission options tab 620b. Similarly, embodiments contemplate the GUI displaying a page corresponding to transmission options tab 620b comprising option parameters for options in transmission option group 320b options of transmission options before GUI displays a third page where the remaining option parameters from "option" options tab 620c may be chosen.

To further describe features of the GUI, an example is now given. For the particular vehicle model of the illustrated example, engine options 602a-602d comprise first option 602a comprising a 5.7 liter V8 engine, second option 602b comprising a 3.6 liter V6 engine, third option 602c comprising a 6.4 liter V8 engine, and fourth option 602d comprising a 3.0 liter V6 engine. Although particular options have been described, embodiments contemplate any number of options, according to particular needs.

Figure 7:
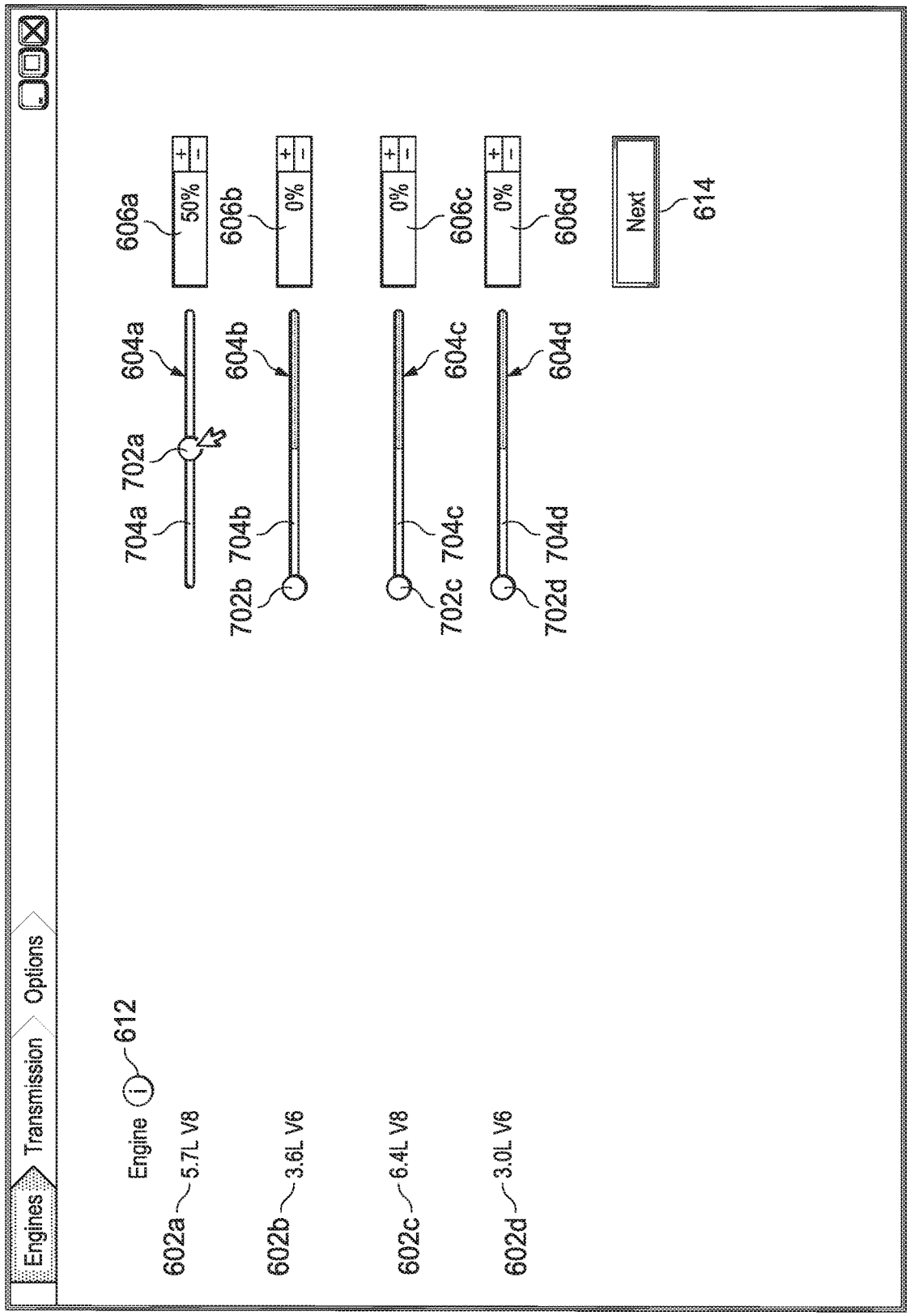
FIG. 7 illustrates the exemplary interface of FIG. 6 after setting a first option parameter for options from the engine option group of FIG. 3, according to an embodiment.

FIG. 7 illustrates exemplary interface 600 of FIG. 6 after setting a first option parameter for options from engine option group 302a of FIG. 3, according to an embodiment. According to embodiments, option parameters for engine options 602a-602d may be set by sliding slide buttons 702a-702d along tracks 704a-704d to a location along the tracks 704a-704d associate with the desired value of the option parameter. In response to setting an option parameter for an option, interface engine 212 automatically updates limits for the other option parameters based on option constraints associated with the option group displayed by the GUI. In this example, an option parameter for first option 602a for the 5.7 L V8 engine option is set to 50%. The option parameter for first option 602a may be set by moving first slide button 702a of first slide bar 604a along track 704a to a location of track 704a associated with the desired value of the option parameter, which, in the illustrated example, is 50%. In addition, or as an alternative, the option parameter for first option 602a may be set by inputting the number "50" into first text input box 606a associated with first engine option 602a. In response to setting the option parameter for first engine option 602a to 50%, interface engine 212 automatically updates limits for the other option parameters on the GUI by preventing each of second, third, and fourth slide buttons 702b-702d of the non-set option parameters from being set to a value exceeding 50% based on the option constraints associated with engine option group 302a, which requires the total mix of engine options 602a-602d to equal 100% (i.e. 100%-50%=50%). According to embodiments, the GUI illustrates the limits for option parameters by coloring a portion of each track 704a-704d a different color (such as red) to indicate at what portions of each track 704a-704d that the slide button 702a-702d may not be set. According to the illustrated example, a portion of second, third, and fourth tracks 704b-704d are shaded to indicate each of these option parameters are limited to 50%.

Figure 8:
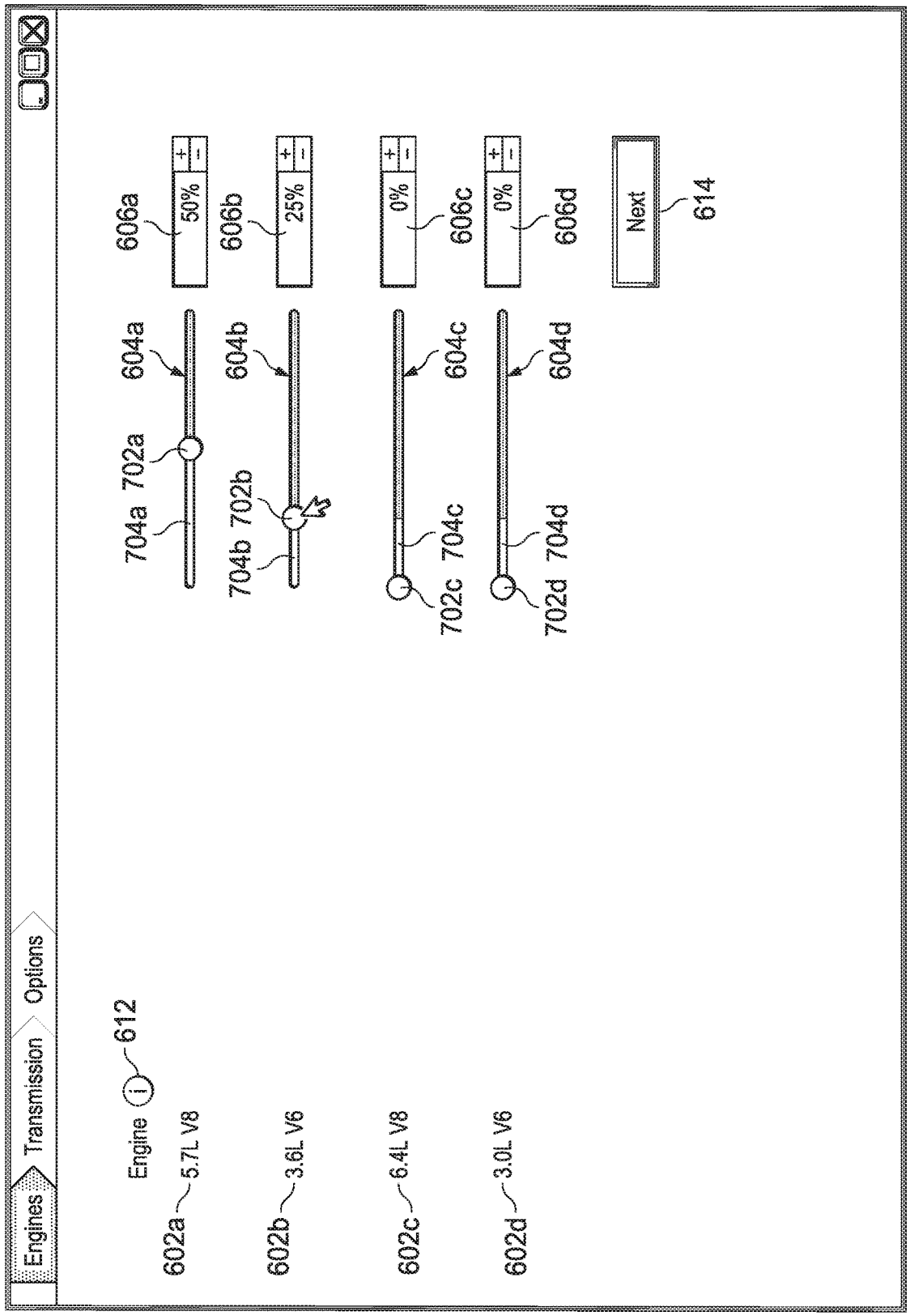
FIG. 8 illustrates the exemplary interface of FIG. 6 after setting a first and a second option parameter for options from the engine option group of FIG. 3, according to an embodiment.

FIG. 8 illustrates exemplary interface 600 of FIG. 6 after setting a first and a second option parameter for options from engine option group 302a of FIG. 3, according to an embodiment. In this example, the option parameter is set to 25% for second engine option 602b comprising the 3.6 L V6. In response, option parameters for third engine option 602c and fourth engine option 602d are automatically updated and limited to no more than 25%, as indicated by the shaded portion of tracks 704c-704d.

Figure 9:
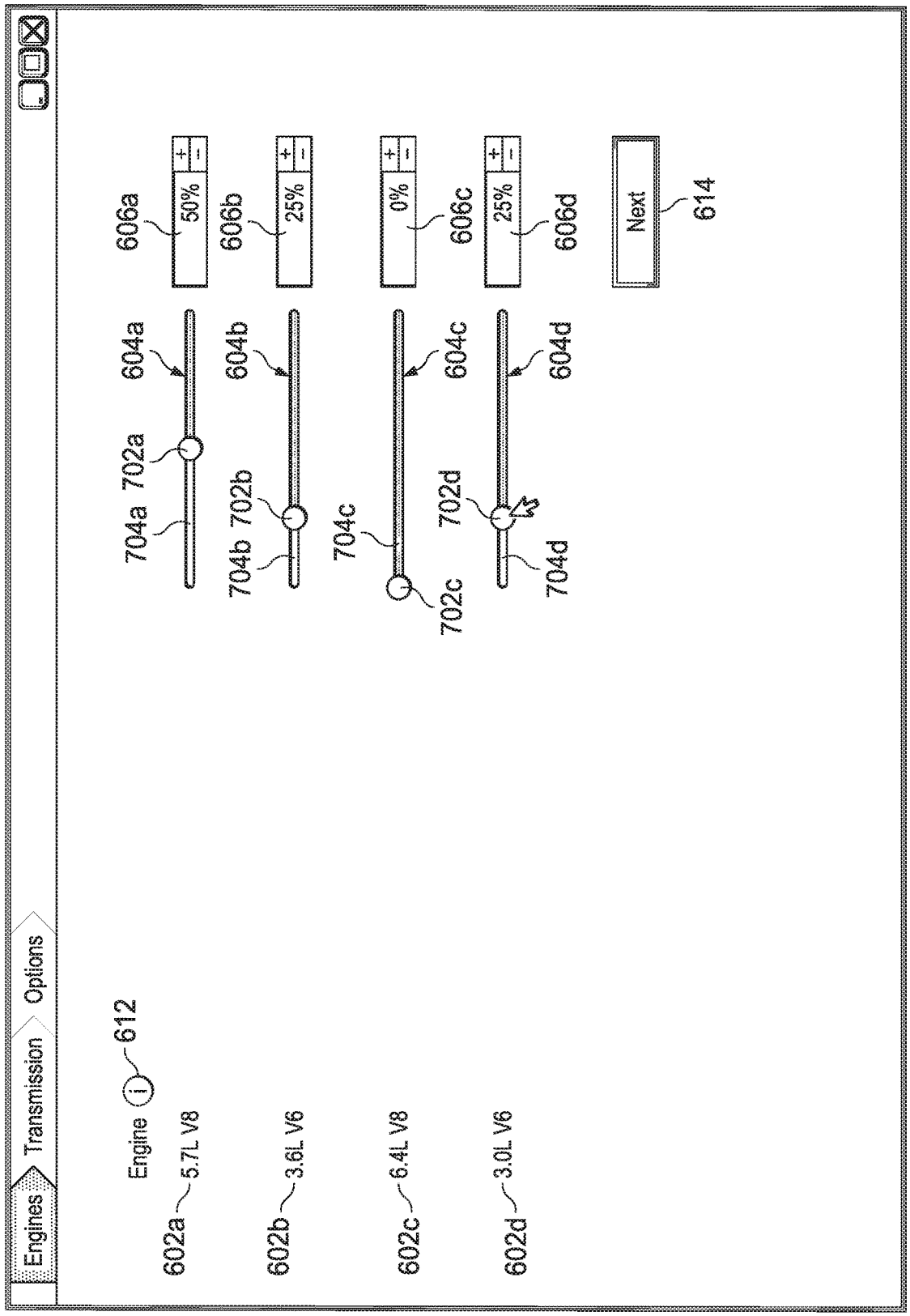
FIG. 9 illustrates the exemplary interface of FIG. 6 after setting a first, a second, and a fourth option parameter for options from the engine option group of FIG. 3, according to an embodiment.

FIG. 9 illustrates exemplary interface 600 of FIG. 6 after setting a first, a second, and a fourth option parameter for options from engine option group 302a of FIG. 3, according to an embodiment. In this example, the option parameter is set to 25% for fourth engine option 602d comprising the 3.0 L V6. In response, option parameters for third engine option 602c is automatically updated and limited to no more than 0%, as indicated by the shaded portion of track 704c.

Figure 10:
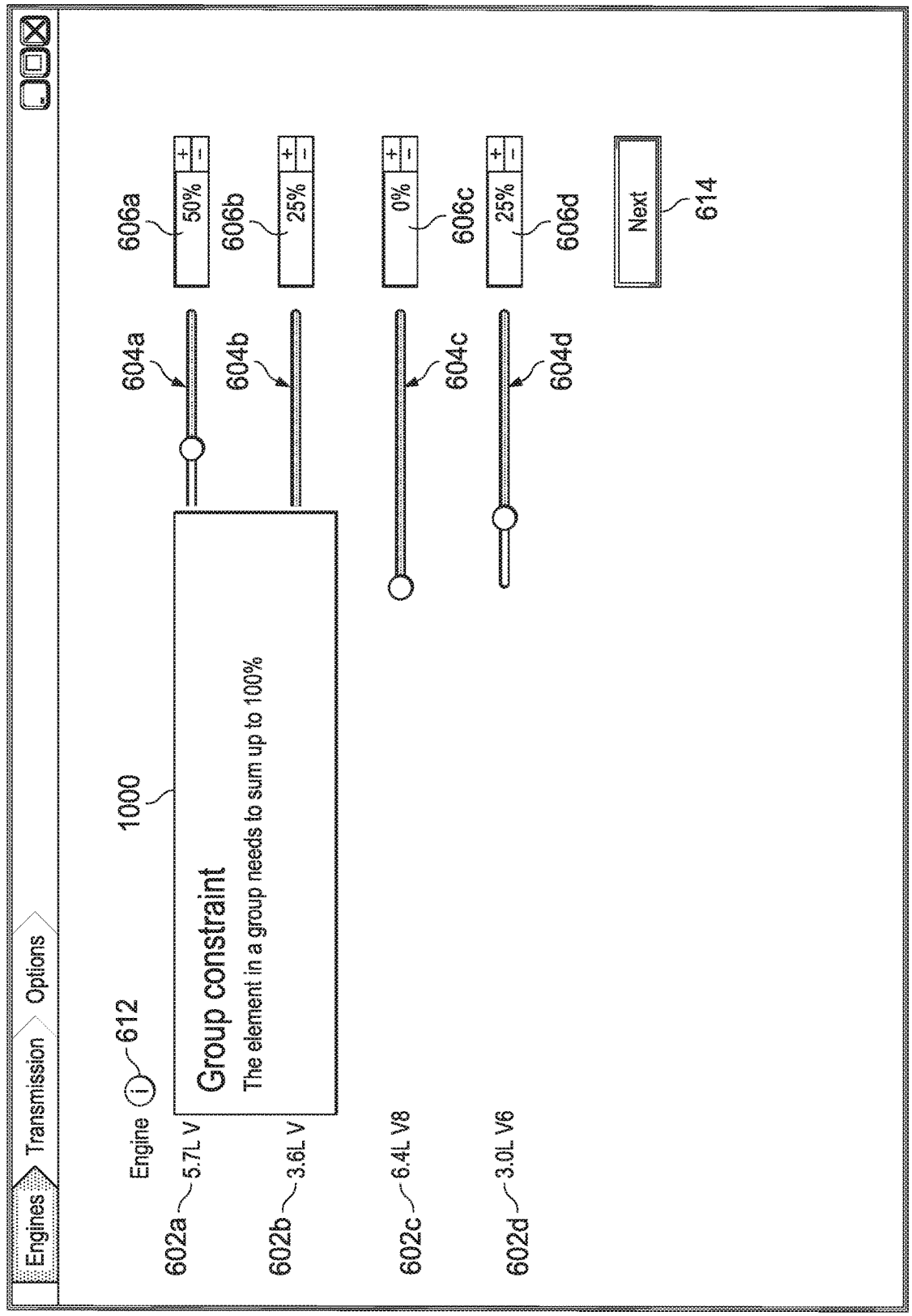
FIG. 10 illustrates the exemplary interface of FIG. 6 displaying a constraint notification, according to an embodiment.

FIG. 10 illustrates exemplary interface 600 of FIG. 6 displaying constraint notification 1000, according to an embodiment. Interface 600 may display constraint notification 1000 in response to user selection of notification button 612. Constraint notification 1000 may describe one or more option constraints 224 associated with engine option group 302a. In this example, constraint notification indicates that the sum of the option parameters for engine options 602a-602d in engine option group 302a must sum to 100%. Although a particular option constraint 224 associated with engine option group 302a is illustrated, embodiments contemplate any suitable option constraints 224, according to particular needs. In addition, or as an alternative, interface 600 may automatically display constraint notification 1000 in response to receiving an input to set one or more option parameters at a value which would be restricted by one or more option constraints 224.

Figure 11:
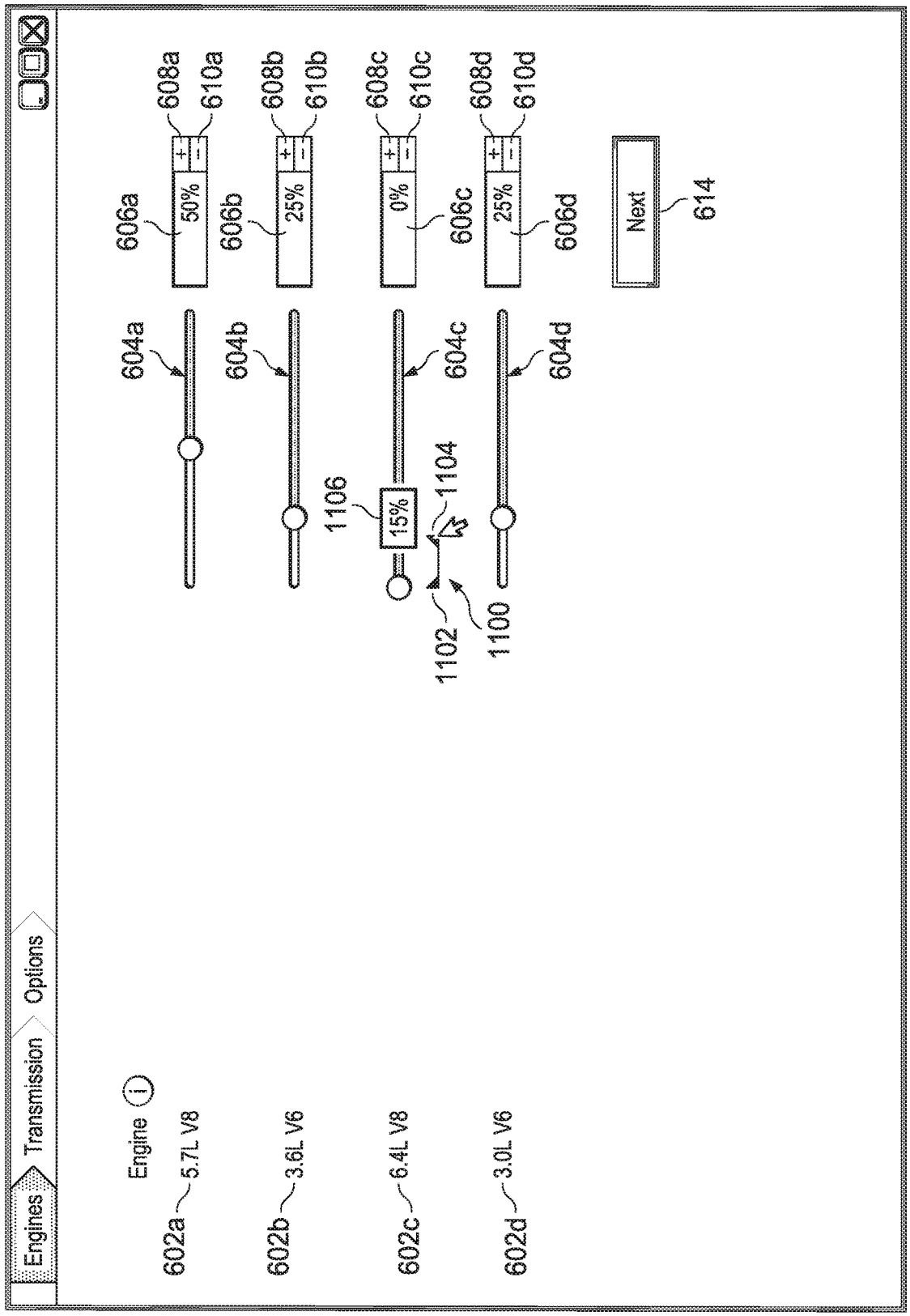
FIG. 11 illustrates the exemplary interface of FIG. 6 after setting an option parameter range, according to an embodiment.

FIG. 11 illustrates exemplary interface 600 of FIG. 6 after setting an option parameter range, according to an embodiment. Interface 600 may comprise one or more interactive elements for setting a range of values for each of the one or more option parameter, including, for example, range indicator 1100 and text input box 606. Range indicator 1100 comprises min range value indicator 1102 and max range value indicator 1104. According to embodiments, a range of values may be set for the option parameter for third engine option 602c by clicking and dragging range indicator 1100 next to track 704c. For example, by clicking and dragging min range value indicator 1102 of range indicator 1100, a user may set a minimum value for the option parameter to a value associated with the location of track 704c associated with that value, such as, for example, 0%. Similarly, by clicking and dragging max range value indicator 1104 of range indicator 1100, a user may set a maximum value for the option parameter any value along slide 704c including, for example, 15%. By setting the maximum and minimum value for the option parameter, engine interface 212 will allow the option parameter for third engine option 602c to take any value between 0 and 15%, inclusive. This permits engine interface 212 to choose an option percentage between these values to allow flexibility in setting other options in this option group or other option groups. Additionally, text input box 606c may be used in connection with max value buttons 608a-608d and min value buttons 610a-610d to set the maximum value and minimum value for the range of values for option parameters. For example, selecting max value buttons 608a-608d causes text input boxes 606a-606c to display the maximum value of the range of the option parameters. In response to entering a value in text input boxes 606a-606d after selection of max value buttons 608a-608d, interface engine 212 updates the maximum value of the range of the option parameter to the entered value. Additionally, in response to entering a value in text input boxes 606a-606d after selection of min value buttons 610a-610d, interface engine 212 updates the minimum value of the range of the option parameter to the entered value. Although engine options 602a-602d are illustrated with a range associated with only third engine option 602c, embodiments contemplate generating a range of values with any one or more of the option parameters associated with engine options 602a-602d, according to particular needs. For example, second engine option 602b may be set to a range for any percentage between approximately 15% and 50% (which may be indicated by range indicator 1100 next to second option track 704b) and third engine option 602c may be set to a range for any percentage between approximately 0% and 25% (which may be indicated by range indicator 1100 next to third option track 704c). Although particular values and ranges are indicated for particular options, embodiments contemplate any suitable options, values, or ranges, according to particular needs.

Figure 12:
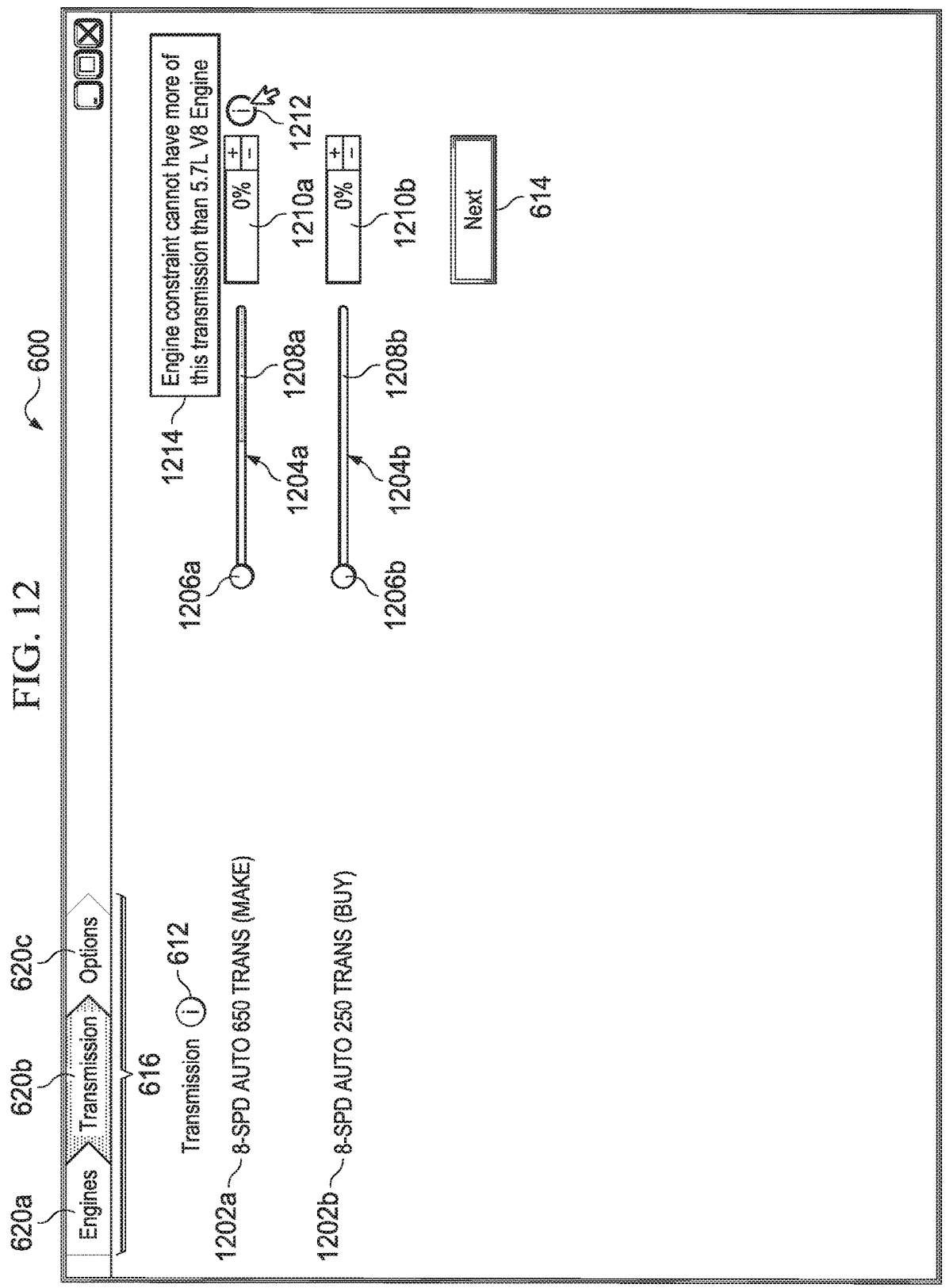
FIG. 12 illustrates the exemplary interface of FIG. 6 providing for setting option parameters for options from the transmission option group of FIG. 3, according to an embodiment.

FIG. 12 illustrates exemplary interface 600 providing for setting option parameters for options from transmission option group 302b of FIG. 3, according to an embodiment. After parameters for one or more of engine options 602a-602d are set, interface 600 may display a page to set or modify one or more transmission options 1202a-1202b. Transmission options 1202a-1202b may comprise first transmission option 1202a comprising an eight-speed automatic 650-model transmission made by one or more manufacturers 150 (8-SPD AUTO 650 TRANS (MAKE)) and second transmission option 1202b comprising an eight-speed automatic 250-model transmission supplied by one or more suppliers 140 (8-SPD AUTO 250 TRANS (BUY)). Although two particular transmission options 1202a-1202b are described, embodiments contemplate any suitable number or type of transmission options, according to particular needs. Parameters for one or more transmission options 1202a-1202b may be set using one or more slide bars 1204a-1204b, each comprising slide buttons 1206a-1206b and tracks 1208a-1208b. In addition, or as an alternative, parameters for transmission options 1202a-1202b may be using one or more value input boxes 1210a-1210b.

As discussed above, based, at least in part, on the priorities associated with engine option group 302a and transmission option group 302b, parameters for one or more engine options 602a-602b may be set before parameters one or more transmission options 1202a-1202b. When parameters for one or more higher-priority options such as, for example, engine options 602a-602b, are set before one or more parameters for one or more lower-priority options, such as, for example, transmission options 1202a-1202b, parameters for the lower-priority options may already be limited based on the parameters set for the one or more higher-priority options and/or constraints associated with one or more options groups. As an example only and not by way of limitation, a parameter for first transmission option 1202a may already be limited, as indicated by the shaded portion of track 1206 based on option constraint 224 associated with engine option group 302a and one or more parameters set for one or more engine options 602a-602d. To view why a parameter first transmission option 1202a is limited, a user may select constraint notification icon 1212. In response to selection of constraint notification icon 1212, interface 600 displays constraint notification 1214, which, according to embodiments, displays text indicating why parameters for one or more options are limited. In the illustrated example, constraint notification 1212 indicates a parameter for first transmission option 1202a is limited because the parameter for first transmission option 1202a cannot comprise a higher value than that selected for the parameter for first engine option 602a comprising a 5.7 L V8 engine. Therefore, because the parameter for the 5.7 L V8 was set as 50% in engine option group 302a, the parameter for first transmission option 1202a is limited to no more than 50%.

Although the options for engine option group 302a and transmission option group 302b were displayed on separate pages in the interface, embodiments contemplate providing the options for more than one option groups 302 simultaneously.

Figure 13:
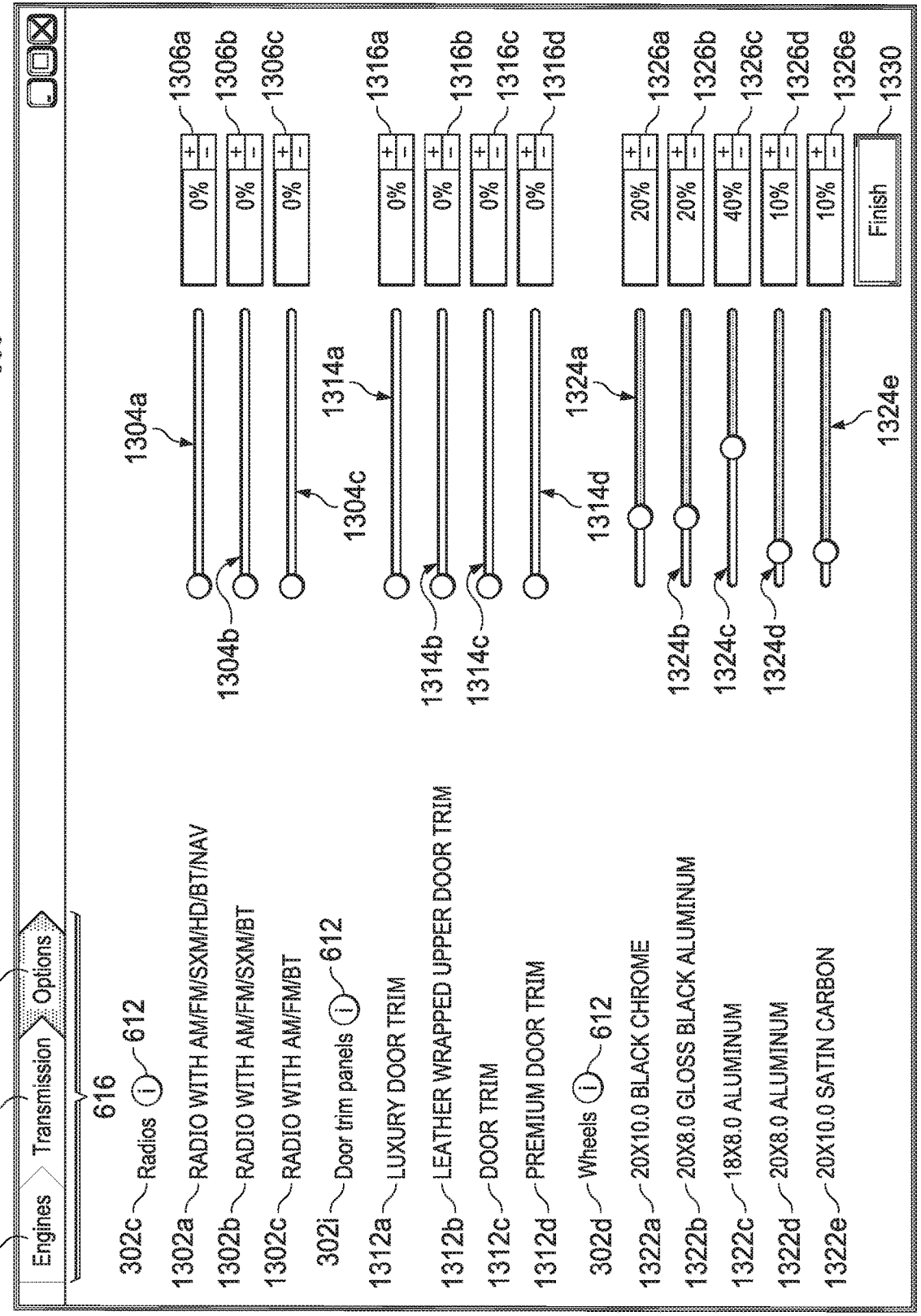
FIG. 13 illustrates the exemplary interface of FIG. 6 providing for setting option parameters for options of three option groups of FIG. 3, according to an embodiment.

FIG. 13 illustrates exemplary interface 600 providing for setting option parameters for options from three option groups 302 of FIG. 3, according to an embodiment. Interface 600 may display interactive elements for setting the values of option parameters for options of more than one of option groups 302. By example only and not by way of limitation, interface 600 may display radios option group 302c comprising radio options 1302a-1302c, door trim panels option group 302i comprising door trim options 1312a-1312d, and wheels option group 302d comprising wheel options 1322a-1322e. Although particular option groups 302 comprising particular options are described, embodiments contemplate any number or combination of option groups 302 comprising any number or combination of options, according to particular needs.

Interactive elements of interface 600 provide for setting the values or range of values for option parameters such as, for example, setting a value or range of values for the mix rate percentages for the displayed options. For example, parameters for radio options 1302a-1302c may be set by slide bars 1304a-1304c and value input boxes 1306a-1306c, parameters for door trim panel options 1312a-1312d may be set by slide bars 1314a-1314d and value input boxes 1316a-1316d, and parameters for wheels options 1322a-1322e may be set by slide bars 1324a-1324e and value input boxes 1326a-1326e. In response to selecting finish button 1330 and/or setting values and/or ranges of values for option parameters, interface 600 may begin processing options plans using the one or more set values or ranges of values. For example, after values and/or ranges of values for option mix rates have been set, option planning engine 206 and/or interface engine 212 may process the mix rates according to option constraints 224, option production constraints 242, models 244 (including, for example, a mathematical model), and/or one or more other factors, as described above. According to embodiments, interface 600 may query a user whether to receive a notification when the processing is completed. This notification may comprise, for example, displaying a text box or sound by interface 600 and/or generating and transmitting an email, text, or any other type of notification, according to particular needs.

After processing, production planner 110 may generate and display results, which may comprise, for example, fixing one or more values or ranges of values for option parameters to generate improved solutions. For example, production planner 110 may fix values or ranges of values for mix rates for one or more options.

After values and/or ranges of values are set for one or more option parameters, option planning engine 206 may determine the take rates and volumes of automobiles and automotive components at the option level. Option planning engine 206 may refine a demand plan according to the mix or the interaction between available automobile options based on the values and/or ranges set in interface 600. In addition, or as an alternative, values and/or ranges of values set in interface 600 may be used by demand planning engine 204 to iteratively refine the demand plan, such as by analyzing the available options and returning to the demand plan to alter take rate percentages or by generating a sales and operation plan optimized to fulfill market demand and generate forecast orders. For example, sales and operations planning engine 208 may refine the values and/or ranges of values for one or more option parameters according to production capacity. For example, interface 600 may pre-populate or limit values or ranges of values for one or more option parameters based, at least in part, on mix rates calculated by production planner 110 that will improve a solution to one or more production, demand, option, sales and operation, or master plan. In addition, or as an alternative, production planner 110 may automatically adjust mix rates to obtain a better solution after modifying other supply chain factors, such as, for example, manufacturing or transporting one or more items, delaying or cancelling the manufacture or transport of one or more items, and/or the like.

Reference in the foregoing specification to "one embodiment", "an embodiment", or "some embodiments" means that a particular feature, structure, or characteristic described in connection with the embodiment is included in at least one embodiment of the invention. The appearances of the phrase "in one embodiment" in various places in the specification are not necessarily all referring to the same embodiment.

While the exemplary embodiments have been shown and described, it will be understood that various changes and modifications to the foregoing embodiments may become apparent to those skilled in the art without departing from the spirit and scope of the present invention.

What is claimed is:

1. A method, comprising:
   receiving, by a server comprising a demand planning engine, an option planning engine, a sales and operations planning engine and an interface engine, option constraint limiting values of a second option parameter based, at least in part, on a value for a first option parameter, wherein the first option parameter and the second option parameter comprise mix rates for options for a configuration and the options are from different option groups;
   refining, by the sales and operations planning engine, limits for the first and second option parameters according to production capacity;
   generating, by the interface engine, an interactive element on a first page of a graphical user interface for setting values of the first option parameter, an interactive element on a second page of the graphical user interface for setting the value for the second option parameter, and an interactive element for navigating a workflow, the workflow comprising the first page and the second page, wherein an order of the first page and the second page correspond to the workflow;
   displaying, on the graphical user interface coupled with the interface engine, the interactive element on the first page for setting values of the first option parameter, wherein the interactive element on the first page must be selected for setting values of the first option parameter before the second page is displayed;
   clicking, by a user, the interactive element for navigating the workflow to display the second page;
   in response to the user clicking the interactive element for navigating the workflow, displaying, on the graphical user interface coupled with the interface engine, the interactive element on the second page for setting the value for the second option parameter;
   in response to a value being set for the first option parameter, calculating, by the interface engine, limits for the values of the second option parameters based, at least in part, on the option constraint and the value set for the first option parameter;
   preventing, by the interface engine, the interactive element for setting the value for the second option parameter to be set to values outside of the calculated limits;
   in response to selection of a constraint notification icon, displaying a constraint notification comprising text indicating why a parameter for an option is limited;
   displaying, on the graphical user interface by the interface engine, an indication that the interactive element for setting the value for the second option parameter is limited to only receive input for values within the calculated limits; and
   refining, by the demand planning engine, a demand plan based on the values set for the first and second option parameters.

2. The method of claim 1, further comprising:
   determining, by the option planning engine, production take rates based, at least in part, on the option constraint and the value for the first option parameter and a value for the second option parameter.

3. The method of claim 2, wherein the production take rates are additionally based, at least in part, one or more of volume constraints, take rate constraints, and production constraints.

4. The method of claim 3, further comprising:
   automatically adjust, by the option planning engine, mix rates for the options in response to and based, at least in part, on modification of one or more supply chain factors.

5. The method of claim 4, wherein the one or more supply chain factors comprise one or more of:
   manufacturing one or more items;
   transporting one or more items;
   delaying a manufacture of one or more items;
   delaying a transport of one or more items;

cancelling the manufacture of one or more items; and
cancelling the transport of one or more items.

6. The method of claim 5, further comprising:
receiving, by the server, a priority associated with one or more option groups;
generating, by the server, a workflow based on the priority associated with the one or more option groups, the workflow comprising an order of displaying pages on the graphical user interface, wherein pages comprising higher priority options are displayed before pages comprising lower priority options.

7. The method of claim 6, wherein the interactive element for setting values of the first option parameter and the interactive element for setting the value for the second option parameter comprise one or more of a slide bar and a value input box.

8. A system, comprising:
a server comprising a demand planning engine, an option planning engine, a sales and operations planning engine and an interface engine, and configured to:
receive option constraint limiting values of a second option parameter based, at least in part, on a value for a first option parameter, wherein the first option parameter and the second option parameter comprise mix rates for options for a configuration and the options are from different option groups;
refine, by the sales and operations planning engine, limits for the first and second option parameters according to production capacity;
generate, by the interface engine, an interactive element on a first page of a graphical user interface for setting values of the first option parameter, an interactive element on a second page of the graphical user interface for setting the value for the second option parameter, and an interactive element for navigating a workflow, the workflow comprising the first page and the second page, wherein an order of the first page and the second page correspond to the workflow;
display the interactive element on the graphical user interface coupled with the interface engine, the interactive element on the first page for setting values of the first option parameter, wherein the interactive element on the first page must be selected for setting values of the first option parameter before the second page is displayed;
receive a click, by a user, of the interactive element for navigating the workflow to display the second page;
in response to the user clicking the interactive element for navigating the workflow, display, on the graphical user interface coupled with the interface engine, the interactive element on the second page for setting the value for the second option parameter;
in response to a value being set for the first option parameter, calculate, by the interface engine, limits for the values of the second option parameters based, at least in part, on the option constraint and the value set for the first option parameter;
prevent, by the interface engine, the interactive element for setting the value for the second option parameter to be set to values outside of the calculated limits;
in response to selection of a constraint notification icon, display a constraint notification comprising text indicating why a parameter for an option is limited;
display an indication that the interactive element on the graphical user interface by the interface engine for setting the value for the second option parameter is limited to only receive input for values within the calculated limits; and
refine, by the demand planning engine, a demand plan based on the values set for the first and second option parameters.

9. The system of claim 8, wherein the server is further configured to:
determine, by the optional planning engine, production take rates based, at least in part, on the option constraint and the value for the first option parameter and a value for the second option parameter.

10. The system of claim 9, wherein the production take rates are additionally based, at least in part, one or more of volume constraints, take rate constraints, and production constraints.

11. The system of claim 10, wherein the server is further configured to:
automatically adjust, by the option planning engine, mix rates for the options in response to and based, at least in part, on modification of one or more supply chain factors.

12. The system of claim 11, wherein the one or more supply chain factors comprise one or more of:
manufacturing one or more items;
transporting one or more items;
delaying a manufacture of one or more items;
delaying a transport of one or more items;
cancelling the manufacture of one or more items; and
cancelling the transport of one or more items.

13. The system of claim 12, wherein the server is further configured to:
receive a priority associated with one or more option groups;
generate a workflow based on the priority associated with the one or more option groups, the workflow comprising an order of displaying pages on the graphical user interface, wherein pages comprising higher priority options are displayed before pages comprising lower priority options.

14. The system of claim 13, wherein the interactive element for setting values of the first option parameter and the interactive element for setting the value for the second option parameter comprise one or more of a slide bar and a value input box.

15. A non-transitory computer-readable medium embodied with software, the software when executed configured to:
receive, by a server comprising a demand planning engine, an option planning engine, a sales and operation planning engine and an interface engine, option constraint limiting values of a second option parameter based, at least in part, on a value for a first option parameter, wherein the first option parameter and the second option parameter comprise mix rates for options for a configuration and the options are from different option groups;
refine, by the sales and operations planning engine, limits for the first and second option parameters according to production capacity;
generate, by the interface engine, an interactive element on a first page of a graphical user interface for setting values of the first option parameter, an interactive element on a second page of the graphical user interface for setting the value for the second option parameter, and an interactive element for navigating a workflow, the workflow comprising the first page and the second page, wherein an order of the first page and the second page correspond to the workflow;

display the interactive element on the graphical user interface coupled with the interface engine, the interactive element on the first page for setting values of the first option parameter, wherein the interactive element on the first page must be selected for setting values of the first option parameter before the second page is displayed;

receive a click, by a user, of the interactive element for navigating the workflow to display the second page;

in response to the user clicking the interactive element for navigating the workflow, display, on the graphical user interface coupled with the interface engine, the interactive element on the second page for setting the value for the second option parameter;

in response to a value being set for the first option parameter, calculate limits for the values of the second option parameters based, at least in part, on the option constraint and the value set for the first option parameter;

prevent, by the interface engine, the interactive element for setting the value for the second option parameter to be set to values outside of the calculated limits;

in response to selection of a constraint notification icon, display a constraint notification comprising text indicating why a parameter for an option is limited;

display an indication that the interactive element on a graphical user interface by the interface engine for setting the value for the second option parameter is limited to only receive input for values within the calculated limits; and refine, by the demand planning engine, a demand plan based on the values set for the first and second option parameters.

16. The non-transitory computer-readable medium of claim 15, wherein the software when executed is further configured to:

determine, by the optional planning engine, production take rates based, at least in part, on the option constraint and the value for the first option parameter and a value for the second option parameter.

17. The non-transitory computer-readable medium of claim 16, wherein the production take rates are additionally based, at least in part, one or more of volume constraints, take rate constraints, and production constraints.

18. The non-transitory computer-readable medium of claim 17, wherein the software when executed is further configured to:

automatically adjust, by the option planning engine, mix rates for the options in response to and based, at least in part, on modification of one or more supply chain factors.

19. The non-transitory computer-readable medium of claim 18, wherein the one or more supply chain factors comprise one or more of:

manufacturing one or more items;
transporting one or more items;
delaying a manufacture of one or more items;
delaying a transport of one or more items;
cancelling the manufacture of one or more items; and
cancelling the transport of one or more items.

20. The non-transitory computer-readable medium of claim 19, wherein the software when executed is further configured to:

receive a priority associated with one or more option groups;

generate a workflow based on the priority associated with the one or more option groups, the workflow comprising an order of displaying pages on the graphical user interface, wherein pages comprising higher priority options are displayed before pages comprising lower priority options.

* * * * *